(12) United States Patent
Katoh et al.

(10) Patent No.: US 10,931,836 B2
(45) Date of Patent: Feb. 23, 2021

(54) COMMUNICATION SYSTEM, IMAGE PROCESSING METHOD, AND RECORDING MEDIUM

(71) Applicants: Takamichi Katoh, Tokyo (JP); Yoshinaga Kato, Kanagawa (JP); Keiichi Kawaguchi, Kanagawa (JP)

(72) Inventors: Takamichi Katoh, Tokyo (JP); Yoshinaga Kato, Kanagawa (JP); Keiichi Kawaguchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/366,422

(22) Filed: Mar. 27, 2019

(65) Prior Publication Data

US 2019/0306334 A1 Oct. 3, 2019

(30) Foreign Application Priority Data

Mar. 29, 2018 (JP) .............................. JP2018-064787
Mar. 25, 2019 (JP) .............................. JP2019-056527

(51) Int. Cl.
*H04N 1/00* (2006.01)
*H04L 29/08* (2006.01)
(Continued)

(52) U.S. Cl.
CPC ..... *H04N 1/00244* (2013.01); *G06K 9/00255* (2013.01); *G06T 5/002* (2013.01);
(Continued)

(58) Field of Classification Search
CPC ........... H04N 1/00244; H04N 1/00209; H04N 5/23229; G06K 9/00255; G06T 5/002; H04L 67/28
See application file for complete search history.

(56) References Cited

U.S. PATENT DOCUMENTS

| 2002/0137529 | A1* | 9/2002 | Takahashi | .......... | H04N 1/00307 |
| | | | | | 455/457 |
| 2006/0174203 | A1* | 8/2006 | Jung | .................. | H04N 1/00161 |
| | | | | | 715/751 |
| 2015/0205500 | A1* | 7/2015 | Zacharias | ............... | G06F 9/451 |
| | | | | | 715/763 |

FOREIGN PATENT DOCUMENTS

| JP | 7-093526 | 4/1995 |
| JP | 2000-242773 | 9/2000 |

(Continued)

*Primary Examiner* — Nicholas G Giles
(74) *Attorney, Agent, or Firm* — Oblon, McClelland, Maier & Neustadt, L.L.P.

(57) ABSTRACT

In a communication system, a data processing terminal transmits a request for obtaining processing information for a specific service to one of an image acquisition terminal and a data processing server; receives a response including processing information from the one of the image acquisition terminal and the data processing server, the processing information indicating processing to be executed by at least one of the image acquisition terminal and the data processing server in providing the specific service; and transmits the processing information to other one of the image acquisition terminal and the data processing server, to cause the other one of the image acquisition terminal and the data processing server to configure settings based on the processing information and execute processing on the captured image data according to the settings.

13 Claims, 24 Drawing Sheets

(51) Int. Cl.
*H04N 5/232* (2006.01)
*G06T 5/00* (2006.01)
*G06K 9/00* (2006.01)
*H04L 29/06* (2006.01)

(52) U.S. Cl.
CPC ......... *H04L 67/28* (2013.01); *H04N 1/00209* (2013.01); *H04N 5/23229* (2013.01); *H04L 67/42* (2013.01); *H04N 2201/0084* (2013.01)

(56) References Cited

FOREIGN PATENT DOCUMENTS

| | | |
|---|---|---|
| JP | 2013-009050 | 1/2013 |
| JP | 2016-110639 | 6/2016 |
| JP | 2016-519812 | 7/2016 |
| JP | 2017-010461 | 1/2017 |
| WO | WO 2014/145877 A2 | 9/2014 |

\* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

FIG. 10A

| MODEL NUMBER (TYPE) | NUMBER OF IMAGING ELEMENTS | LENS TYPE |
|---|---|---|
| AAA111 | 1 | WIDE-ANGLE LENS |
| AAA112 | 2 | FISH-EYE LENS |
| ... | ... | ... |

FIG. 10B

| NUMBER OF IMAGING ELEMENTS | CYCLE VALUE (fps) |
|---|---|
| 1 | 60 |
| 2 | 30 |
| ... | ... |

FIG. 11A

| NUMBER OF IMAGING ELEMENTS | IMAGE ACQUISITION PROGRAM | INSTALL |
|---|---|---|
| 1 | ProgC01 (1 SYSTEM) | 1 |
| 2 | ProgC02 (2 SYSTEMS) | 1 |
| ... | ... | ... |

FIG. 11B

| NUMBER OF IMAGING ELEMENTS | IMAGE COMPOSITION PROGRAM | INSTALL |
|---|---|---|
| 1 | OBJECT DETECTOR | 0 |
| 2 | ProgS02 (IMAGE COMPOSITION) | 1 |
| ... | ... | ... |

FIG. 11C

| LENS TYPE | DISTORTION CORRECTION PROGRAM | INSTALL |
|---|---|---|
| WIDE-ANGLE LENS | ProgW01 (WIDE-ANGLE CORRECTION) | 1 |
| FISH-EYE LENS | ProgW02 (FISH-EYE CORRECTION) | 1 |
| ... | ... | ... |

FIG. 11D

| AUTHENTICATION SERVER ID | SERVICE PROGRAM | INSTALL |
|---|---|---|
| a01 | ProgD01 (OBJECT RECOGNITION) | 1 |
| a02 | ProgD02 (OBJECT BLURRING) | 1 |
| a03 | ProgD03 (...) | ... |

FIG. 12A SERVICE NAME: OBJECT RECOGNITION

| ITEM | VALUE |
|---|---|
| OBJECT DETECTION | ON |
| IMAGE SIZE_Width | 200 |
| IMAGE SIZE_Height | 200 |
| PROJECTION METHOD | PERSPECTIVE |

FIG. 12B SERVICE NAME: OBJECT BLURRING

| ITEM | VALUE |
|---|---|
| OBJECT BLURRING | OFF |
| IMAGE SIZE_Width | 3840 |
| IMAGE SIZE_Height | 2160 |
| PROJECTION METHOD | EQUIRECTANGULAR |

FIG. 12C SERVICE NAME: OBJECT BLURRING

| ITEM | VALUE |
|---|---|
| OBJECT BLURRING | ON |
| IMAGE SIZE_Width | 3840 |
| IMAGE SIZE_Height | 2160 |
| PROJECTION METHOD | EQUIRECTANGULAR |

FIG. 13

| VERIFICATION DATA FILE NAME | NAME |
|---|---|
| kato.jpg | Kato |
| asai.jpg | Asai |
| ... | ... |

FIG. 14

SESSION MANAGEMENT TABLE

| SESSION ID | TERMINAL ID | IP ADDRESS |
|---|---|---|
| se01 | asai@myhost.ricoo.com/theta1 | 1.2.1.3 |
| se02 | asai@myhost.ricoo.com/pc | 1.2.1.4 |
| se03 | jim@myhost.obrom.com/theta2 | 1.2.2.3 |
| ... | ... | ... |

FIG. 16

AUTHENTICATION SERVER MANAGEMENT TABLE

| AUTHENTICATION SERVER ID | AUTHENTICATION SERVER URL |
|---|---|
| a01 | http:// ··· |
| a02 | http:// ··· |
| a03 | http:// ··· |
| ... | ... |

FIG. 17A

AUTHENTICATION MANAGEMENT TABLE

| USER ID (SUBJECT FOR AUTHENTICATION) | PASSWORD |
|---|---|
| asai@myhost.ricoo.com | aaaa |
| jim@myhost.obrom.com | abab |
| ... | ... |

FIG. 17B

AUTHENTICATION MANAGEMENT TABLE

| USER ID (SUBJECT FOR AUTHENTICATION) | PASSWORD |
|---|---|
| asai | baba |
| kurt | bbbb |
| ... | ... |

FIG. 17C

AUTHENTICATION MANAGEMENT TABLE

| USER ID (SUBJECT FOR AUTHENTICATION) | PASSWORD |
|---|---|
| kondo | caca |
| kulbaski | cccc |
| ... | ... |

| ITEM | VALUE |
|---|---|
| OBJECT BLURRING | ON |
| RECORD IMAGE | ON |

| ITEM | VALUE |
|---|---|
| OBJECT BLURRING | OFF |
| RECORD IMAGE | ON |

COMMUNICATION SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-064787, filed on Mar. 29, 2018, and 2019-056527, filed on Mar. 25, 2019, in the Japan Patent Office, the entire disclosure of which is hereby incorporated by reference herein.

BACKGROUND

Technical Field

The present disclosure relates to a communication system, an image processing method, and a recording medium.

Description of the Related Art

Recently, Internet of Things (IoT) attracts attention, such as communication systems utilizing edge computing. In such communication system, a terminal acquires image data, and transmits the image data to a server via the Internet to request for processing to analyze the image data. For example, a cloud service platform is known, which performs processing to recognize a human face at a server. Specifically, a camera is provided at the image acquisition terminal (edge node). The image acquisition terminal transmits image data captured at the camera to the centralized server (a face recognition application server), to request for performing processing to recognize a human face in the captured image.

SUMMARY

Example embodiments include a communication system including: an image acquisition terminal configured to obtain captured image data captured with an imaging unit; a data processing server configured to perform processing on the captured image data; and a data processing terminal configured to intermediate data between the image acquisition terminal and the data processing server, and transmit the captured image data to the data processing server via a network. The data processing terminal includes circuitry to: in response to a request for performing a specific service, transmit a request for obtaining processing information for the specific service to one of the image acquisition terminal and the data processing server; receive a response including processing information from the one of the image acquisition terminal and the data processing server, the processing information indicating processing to be executed by at least one of the image acquisition terminal and the data processing server in providing the specific service; and transmit the processing information to other one of the image acquisition terminal and the data processing server, to cause the other one of the image acquisition terminal and the data processing server to configure settings based on the processing information and execute processing on the captured image data according to the settings.

Example embodiments include an image processing method, performed by a data processing terminal that intermediates data between an image acquisition terminal and a data processing server, the method including: in response to a request for performing a specific service, transmitting a request for obtaining processing information for the specific service to one of the image acquisition terminal and the data processing server; receiving a response including processing information from the one of the image acquisition terminal and the data processing server, the processing information indicating processing to be executed by at least one of the image acquisition terminal and the data processing server in providing the specific service; and transmitting the processing information to other one of the image acquisition terminal and the data processing server, to cause the other one of the image acquisition terminal and the data processing server to configure settings based on the processing information and execute processing on the captured image data according to the settings.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10A is a conceptual diagram illustrating an example of image element data management table;

FIG. 10B is a conceptual diagram illustrating an example of cycle value management table;

FIG. 11A is a conceptual diagram illustrating an example of image acquisition program management table;

FIG. 11B is a conceptual diagram illustrating an example of image composition program management table;

FIG. 11C is a conceptual diagram illustrating an example of distortion correction program management table;

FIG. 11D is a conceptual diagram illustrating an example of service program management table;

FIG. 12A is a conceptual diagram illustrating an example of processing information management table for object recognition service;

FIGS. 12B and 12C are each a conceptual diagram illustrating an example of processing information management table for object blurring service;

FIG. 13 is a conceptual diagram illustrating an example of verification data management table;

FIG. 14 is a conceptual diagram illustrating an example of session management table;

FIG. 16 is a conceptual diagram illustrating an example of authentication server management table;

FIGS. 17A, 17B, and 17C are each a conceptual diagram illustrating an example of authentication management table;

Figure 1:
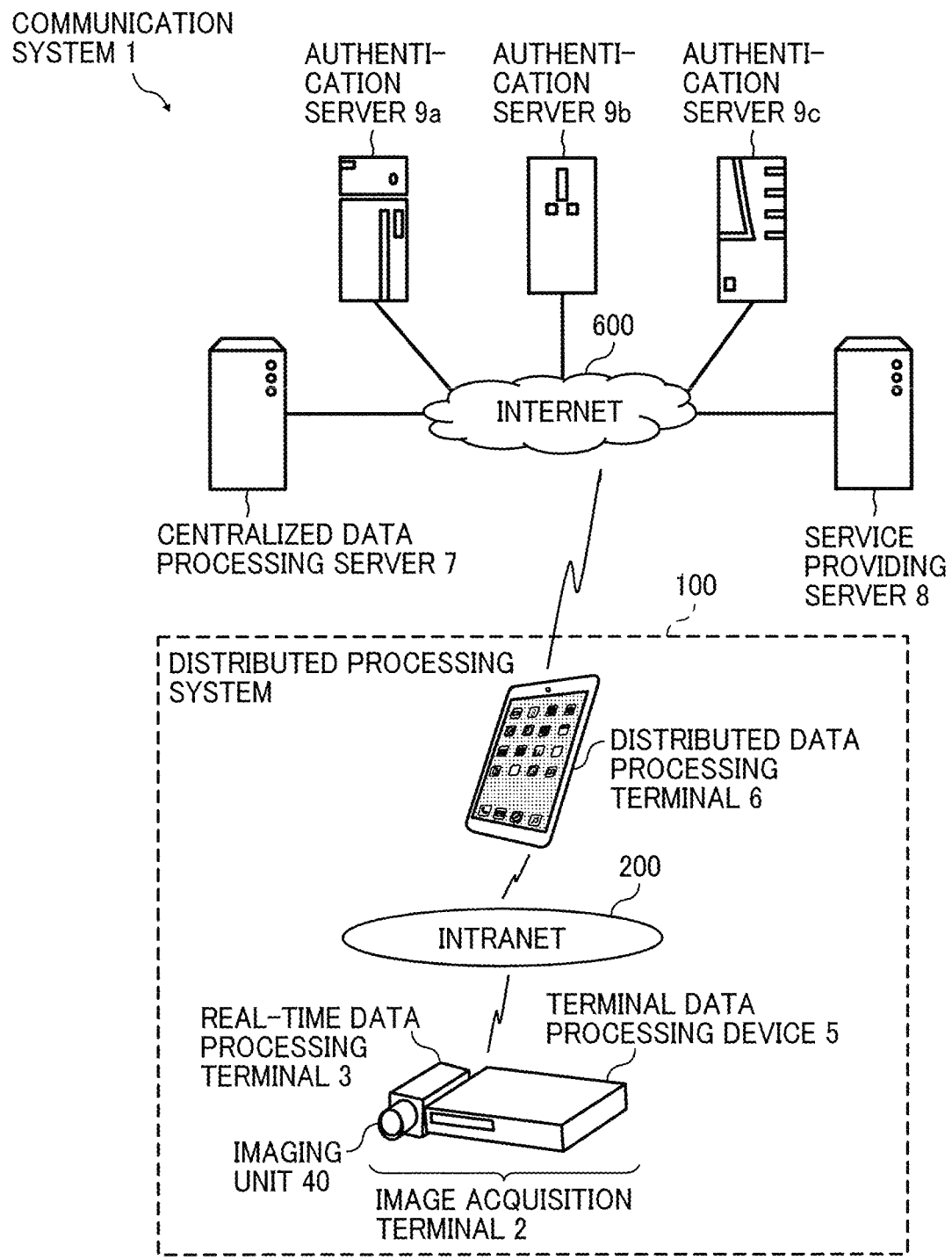
FIG. 1 is a schematic diagram illustrating a communication system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview

Referring to the drawings, one or more embodiments of the present invention are described. The following describes a communication system for edge computing. As described below, the image acquisition terminal 2 and the service providing server 8 operate in cooperation with each other to provide various types of services. Specifically, the image acquisition terminal 2, as an edge device, performs operation according to various types of services provided by the service providing server 8.

<<System Configuration>>

FIG. 1 is a schematic diagram illustrating a configuration of a communication system 1 according to an embodiment. As illustrated in FIG. 1, the communication system 1 of this embodiment includes a real-time data processing terminal 3, a terminal data processing device 5, a distributed data processing terminal 6, the centralized data processing server 7, a service providing server 8, and a plurality of authentication servers 9a, 9b, and 9c. The real-time data processing terminal 3, the terminal data processing device 5, and the distributed data processing terminal 6 together operate as a distribution processing system 100. For the descriptive purposes, only one distribution processing system 100 is illustrated in FIG. 1, while more than one distribution processing system 100 may be provided.

The terminal data processing device 5 is communicably connected to the distributed data processing terminal 6 via the intranet 200. The distributed data processing terminal 6 is communicably connected to the centralized data processing server 7, the service providing server 8, and the authentication servers 9a, 9b, and 9c via the Internet 600. In this disclosure, the authentication servers 9a, 9b, and 9c are collectively referred to as the authentication server 9.

The real-time data processing terminal 3 is a terminal that captures images in real-time to obtain real-time captured image data. This processing to capture images in real-time may be referred to as real-time processing. The real-time data processing terminal 3 is detachably connected to an imaging unit 40 provided with an image sensor that captures an image of a target, such as a Complementary Metal Oxide Semiconductor (CMOS) sensor or a Charge Coupled Device (CCD) sensor. The real-time data processing terminal 3 digitizes the captured image, which is input from the imaging unit 40, into captured image data, and detects a specific object (here, an image of a human face) in the captured image (the image including background) in real-time (for example, every 1/60 seconds). The real-time data processing terminal 3 transmits, to the terminal data processing device 5, data of a partial image of the captured image having the detected object ("partial image data"). While a human face is a target for detection in this disclosure, any other part of a human body may be detected to generate a captured image, such as a human head, an upper body or a lower body of the human, a part of the human face such as eyes, etc. In alternative to or in addition to the human, any object such as an automobile or an animal may be subjected to detection. When an automobile is a target for detection, a driver or a passenger in the automobile, or a license plate attached to the automobile, may be detected. When an animal is a target for detection, a face, or a pattern of its body may be detected.

The terminal data processing device 5, which is located closely to the real-time data processing terminal 3, is connected to the real-time data processing terminal 3 in a one-to-one correspondence, for example, by a data bus, a Universal Serial Bus (USB), or the like. The terminal data processing device 5 encodes the partial image data received from the real-time data processing terminal 3 into encoded partial image data in a general-purpose format such as Joint Photographic Experts Group (JPEG). The terminal data processing device 5 further transmits the encoded partial image data to the distributed data processing terminal 6 via the intranet 200. The encoded partial image data is used as data to be verified in processing of object image (facial image) verification, at the centralized data processing server 7. The real-time data processing terminal 3 and the terminal data processing device 5 are connected with each other so as to together function as the image acquisition terminal 2. In this example, the partial image data may be encoded in a standard format, such as JPEG, by the real-time data processing terminal 3 or the terminal data processing device 5. Further, while only one image acquisition terminal 2 is shown in this figure, any number of image acquisition terminals 2 may be provided in the system.

The distributed data processing terminal 6 is a computer that accepts various operations from a user, and is disposed at a location relatively close to the terminal data processing device 5, compared to a location of the centralized data processing server 7 with respect to the distributed data processing terminal 6. The distributed data processing terminal 6 previously registers verification data for facial image verification. The distributed data processing terminal 6 transmits a request, via the Internet 600, for requesting the centralized data processing server 7 to verify the data to be verified, using the verification data. In such case, the distributed data processing terminal 6 also transmits, to the centralized data processing server 7, the data to be verified that is received from the terminal data processing device 5 and the pre-registered verification data that is registered to the distributed data processing terminal 6. In response, the distributed data processing terminal 6 receives, from the centralized data processing server 7, verification result information indicating the verification result. Further, the distributed data processing terminal 6 displays the received verification result via a graphical interface.

The centralized data processing server 7 is disposed at a location relatively far from the terminal data processing device 5, compared to a location of the terminal data processing device 5 to the distributed data processing terminal 6. The centralized data processing server 7 communicates with the distributed data processing terminal 6 via a communication network such as the Internet 600. In response to reception of the verification request, the verification data, and the data to be verified, the centralized data processing server 7 compares between the verification data and the data to be verified to calculate the degree of similarity. The centralized data processing server 7 transmits verification result information indicating the verification result that includes the calculated similarity to the distributed data processing terminal 6. The verification result information may further include, for example, a device identifier (ID) of the distributed data processing terminal 6 that has transmitted the verification request, a device ID of the image acquisition terminal 2 that has transmitted the data to be verified, the calculated date and time, a target for verification such as a name of a person being verified or a number being verified.

The service providing server 8 provides the image acquisition terminal 2 with various services.

The authentication server 9 authenticates the image acquisition terminal 2, to determine whether or not the image acquisition terminal 2 (or user) has authorized authority to receive various services from the service providing server 8. As described below, authentication of the image acquisition terminal 2 is performed using an ID of the distributed data processing terminal 6 (or a user ID of the user) managing the image acquisition terminal 2.

<<Hardware Configuration>>

Referring now to FIGS. 2 to 6, a hardware configuration of the communication system 1 is described according to the embodiment.

<Hardware Configuration of Real-Time Data Processing Terminal>

Figure 2:
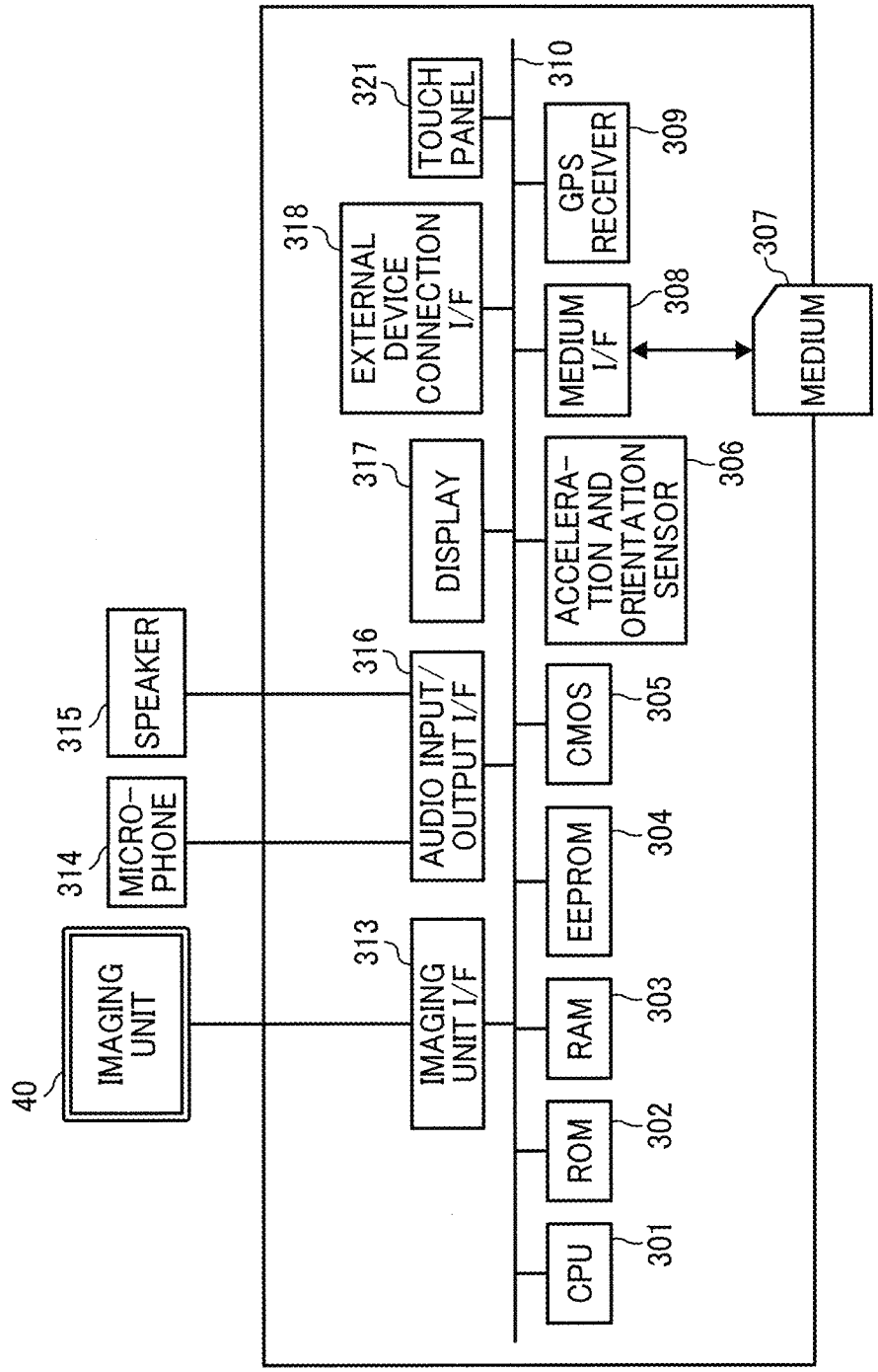
FIG. 2 is a schematic diagram illustrating a hardware configuration of a real-time data processing terminal, according to an embodiment.

FIG. 2 is a schematic diagram illustrating a hardware configuration of the real-time data processing terminal 3, according to the embodiment. The real-time data processing terminal 3 includes a CPU 301, a ROM 302, a RAM 303, an EEPROM 304, a CMOS sensor (CMOS) 305, an acceleration and orientation sensor 306, a medium I/F 308, and a GPS receiver 309.

The CPU 301 controls entire operation of the real-time data processing terminal 3. The ROM 302 stores a control program for operating the CPU 301. The RAM 303 is used as a work area for the CPU 301. The EEPROM 304 reads or writes various data such as a control program for the real-time data processing terminal 3 under control of the CPU 301. Under control of the CPU 301, the CMOS sensor 305 captures an image of a target (mainly a blind spot of the imaging unit 40) to obtain captured image data. The acceleration and orientation sensor 306 includes various sensors such as an electromagnetic compass for detecting geomagnetism, a gyrocompass, and an acceleration sensor. The medium I/F 308 controls reading or writing of data with respect to a recording medium 307 such as a flash memory. The GPS receiver 309 receives a GPS signal from a GPS satellite.

The real-time data processing terminal 3 further includes an imaging unit I/F 313, a microphone 314, a speaker 315, an audio input/output I/F 316, a display 317, an external device connection I/F 318, and a touch panel 321.

The imaging unit I/F 313 is a circuit that controls driving of the imaging unit 40 when an external imaging unit 40 is connected to the real-time data processing terminal 3. The microphone 314 is an example of built-in audio collecting device capable of inputting audio under control of the CPU 301. The audio I/O I/F 316 is a circuit for inputting or outputting an audio signal to the microphone 314 or from the speaker 315 under control of the CPU 301. The display 317 may be a liquid crystal or organic electro luminescence (EL) display that displays an image of a target, an operation icon, or the like. The external device connection I/F 318 is an interface circuit that connects the real-time data processing terminal 3 to various external devices. The touch panel 321 is an example of input device that enables the user to input a user instruction to the real-time data processing terminal 3 through touching a screen of the display 317.

The real-time data processing terminal 3 further includes a bus line 310. The bus line 310 is an address bus or a data bus, which electrically connects the elements in FIG. 2 such as the CPU 301.

<Hardware Configuration of Imaging Unit>

Figure 3A:
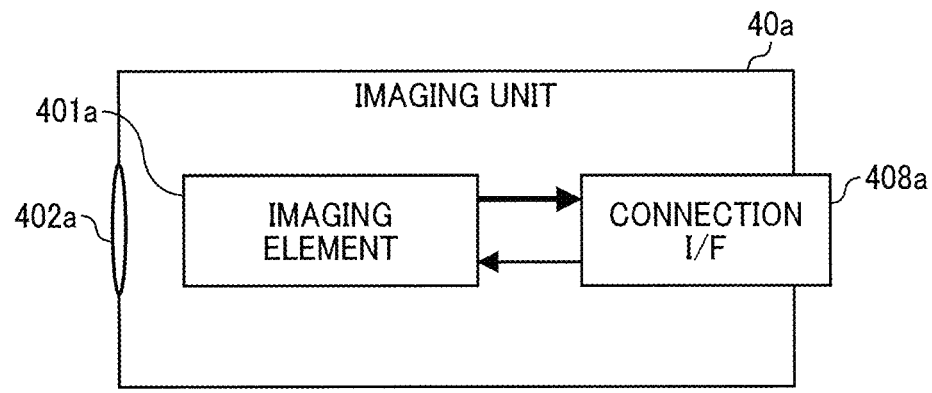
FIGS. 3A and 3B (FIG. 3) are schematic diagrams each illustrating an example of a hardware configuration of an imaging unit, according to an embodiment.
Figure 3B:
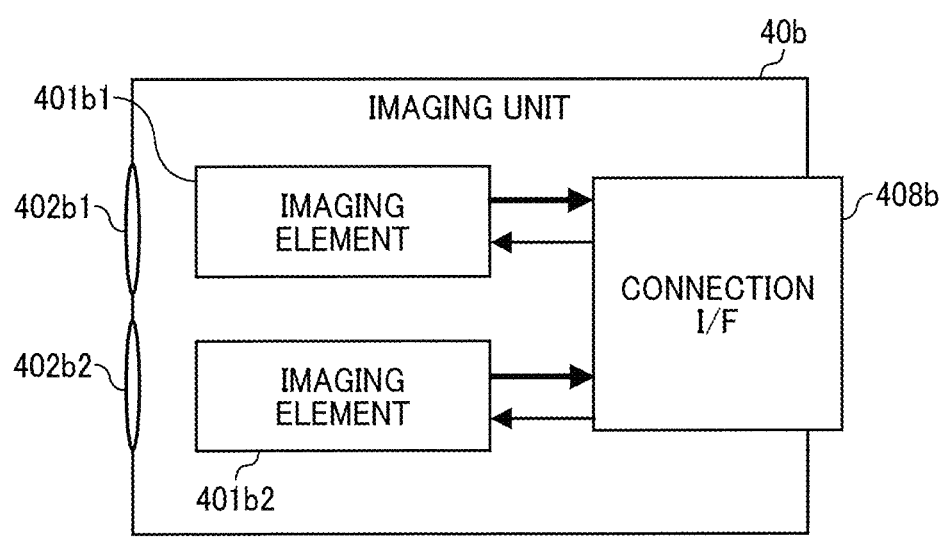

FIGS. 3A and 3B are each a schematic block diagram illustrating a hardware configuration of the imaging unit 40, according to the embodiment. Specifically, FIG. 3A illustrates a hardware configuration of a monocular imaging unit 40a, as an example of the imaging unit 40. FIG. 3B illustrates a hardware configuration of a compound eye imaging unit 40b, as an example of the imaging unit 40. The imaging unit 40 is a generic term for a plurality of types of imaging units (imaging unit 40a, 40b, etc.) having different number of imaging elements or having different types of imaging elements. As described below, example types of imaging elements include, but not limited to, standard zoom lens, fish-eye lens, wide-angle lens, which may be determined according to a specific application of the imaging unit 40.

As illustrated in FIG. 3A, the imaging unit 40a includes an imaging element 401a such as a CMOS or a CCD, a lens 402a, and a connection I/F 408a to be electronically connected to the imaging unit I/F 313 of the real-time data processing terminal 3. The lenses 402a is, for example, a standard lens, wide-angle lens, or fish-eye lens, which is suitable to correct distortion. When the imaging unit 40a is connected to the imaging unit I/F 313 of the real-time data processing terminal 3, the imaging element 401a captures an image according to an imaging control signal transmitted from the imaging unit I/F 313 via the connection I/F 408a. Accordingly, the imaging unit 40a illustrated in FIG. 3A obtains a planar image.

As illustrated in FIG. 3B, the imaging unit 40b includes imaging elements 401b1 and 401b2 each may be a CMOS or a CCD, lenses 402b1 and 402b2, and a connection I/F 408b to be electronically connected to the imaging unit I/F 313 of the real-time data processing terminal 3. The lenses 402b1 and 402b2 are, for example, fish-eye lenses. When the imaging unit 40b is connected to the imaging unit I/F 313 of the real-time data processing terminal 3, each of the imaging element 401b1 and 401b2 captures an image according to an imaging control signal transmitted from the imaging unit I/F 313 via the connection I/F 408b, and transmits the captured image to the imaging unit I/F 313. Accordingly, a plurality of images is transmitted as captured image data. Accordingly, the imaging unit 40b illustrated in FIG. 3B obtains a spherical image, which may be referred to as an equirectangular projection image as described below.

Figure 4A:
FIG. 4A is a view illustrating a hemispherical image (front side) captured by the imaging unit of FIG. 3B.
Figure 4B:
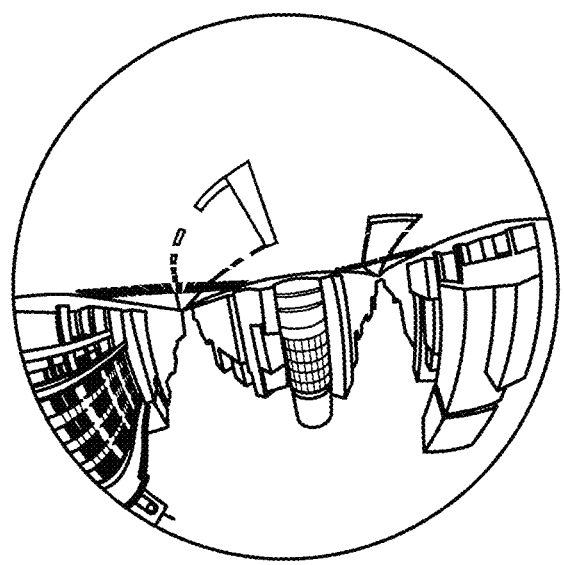
FIG. 4B is a view illustrating a hemispherical image (back side) captured by the imaging unit of FIG. 3B.
Figure 4C:
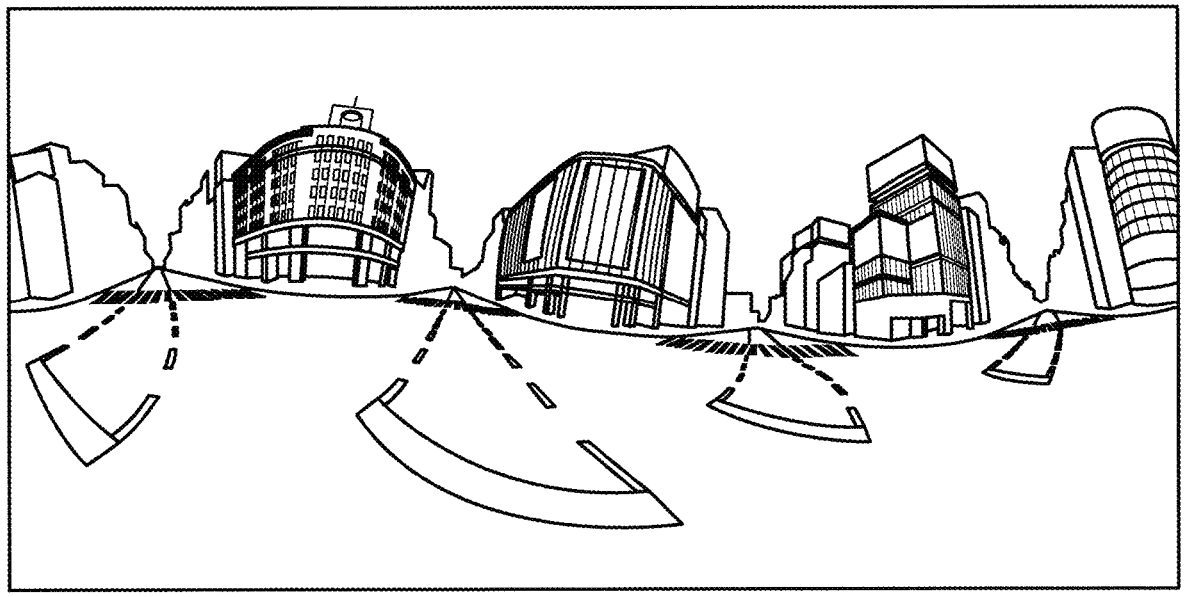
FIG. 4C is a view illustrating an image in equirectangular projection, generated by the imaging unit of FIG. 3B.

Next, referring to FIGS. 4A to 4C, a description is given of an overview of operation of generating an equirectangular projection image EC from the images captured by the imaging unit 40b. FIG. 4A is a view illustrating a hemispherical image (front side) captured by the imaging unit 40b. FIG. 4B is a view illustrating a hemispherical image (back side) captured by the imaging unit 40b. FIG. 4C is a view illustrating an image in equirectangular projection, which is referred to as an "equirectangular projection image" (or equidistant cylindrical projection image) EC.

As illustrated in FIG. 4A, an image captured by the imaging element 401b1 is a curved hemispherical image (front side) taken through the lens 402b1. Similarly, as illustrated in FIG. 4B, an image captured by the imaging element 401b2 is a curved hemispherical image (back side) taken through the lens 402b2. The hemispherical image (front side) and the hemispherical image (back side), which are reversed by 180-degree from each other, are combined by the real-time data processing terminal 3. This results in generation of the equirectangular projection image EC as illustrated in FIG. 4C. Here, the lenses are arranged to face each other, such that the front side and the back side of the imaging unit 40 can be captured to obtain hemispherical images of both sides, to generate the equirectangular projection image EC as illustrated in FIG. 4C.

<Hardware Configuration of Terminal Data Processing Device and Distributed Data Processing Terminal>

Figure 5:
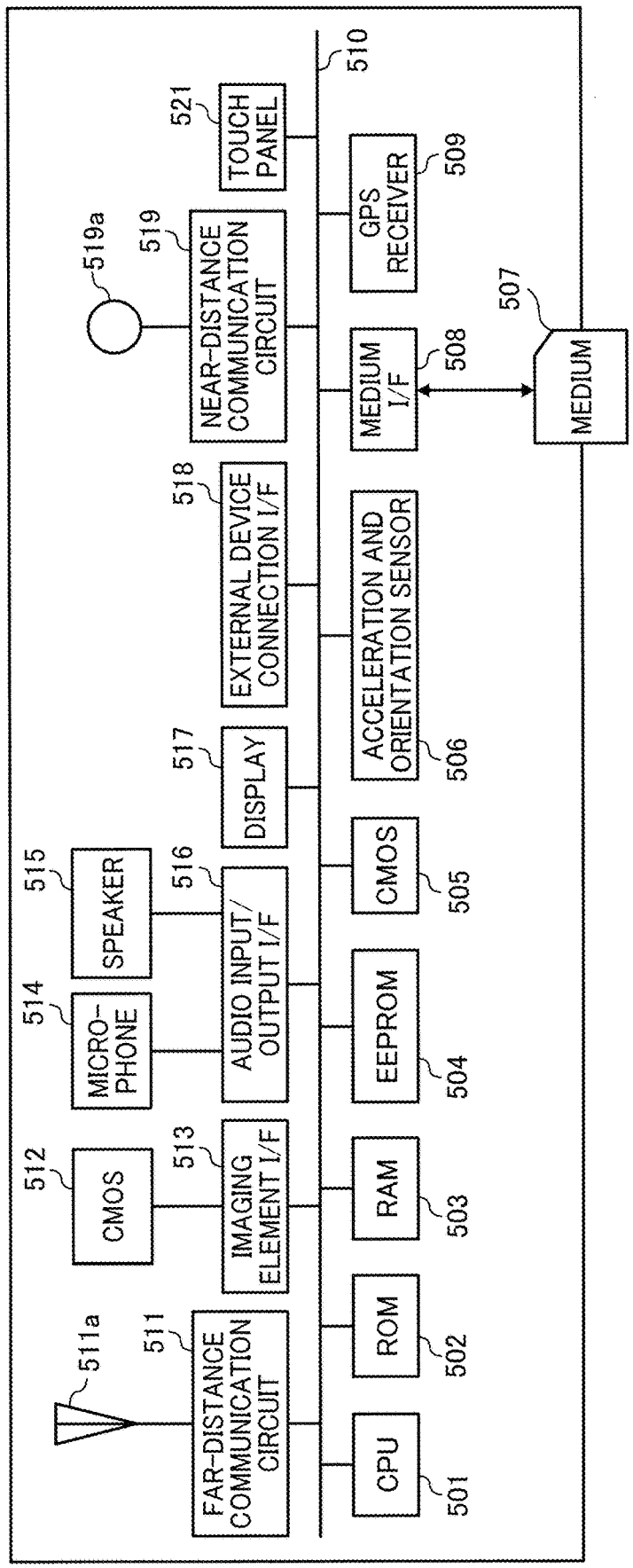
FIG. 5 is a schematic diagram illustrating a hardware configuration of each one of a terminal data processing device and a distributed data processing terminal, according to the embodiment.

FIG. 5 is a schematic diagram illustrating a hardware configuration of each one of the terminal data processing device 5 and the distributed data processing terminal 6, according to the embodiment. Since the terminal data processing device 5 and the distributed data processing terminal 6 are substantially the same in hardware configuration, an example case of the terminal data processing device 5 is described below, while omitting the description of the distributed data processing terminal 6.

As illustrated in FIG. 5, the terminal data processing device 5 includes a CPU 501, a ROM 502, a RAM 503, an EEPROM 504, a CMOS sensor 505, an acceleration and orientation sensor 506, a medium I/F 508, and a GPS receiver 509.

The CPU 501 controls entire operation of the terminal data processing device 5. The ROM 502 stores a control program for controlling the CPU 501. The RAM 503 is used as a work area for the CPU 501. The EEPROM 504 reads or writes various data such as a control program for the terminal data processing device 5 under control of the CPU 501. The CMOS sensor 505 captures an object (for example, a self-image of the user operating the terminal data processing device 5) under control of the CPU 501 to obtain captured image data. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The terminal data processing device 5 further includes a far-distance communication circuit 511, an antenna 511a for the far-distance communication circuit 511, a CMOS sensor 512, an imaging element I/F 513, a microphone 514, a speaker 515, an audio input/output I/F 516, a display 517, an external device connection I/F 518, a near-distance communication circuit 519, an antenna 519a for the near-distance communication circuit 519, and a touch panel 521.

The far-distance communication circuit 511 is a circuit that communicates with another device through the intranet 200, for example. The camera 112 is an example of built-in imaging device capable of capturing a target under control of the CPU 501. The imaging element I/F 513 is a circuit that controls driving of the CMOS sensor 512. The microphone 514 is an example of built-in audio collecting device capable of inputting audio under control of the CPU 501. The audio I/O I/F 516 is a circuit for inputting or outputting an audio signal to the microphone 514 or from the speaker 515 under control of the CPU 501. The display 517 may be a liquid crystal or organic electro luminescence (EL) display that displays an image of a subject, an operation icon, or the like. The external device connection I/F 518 is an interface circuit that connects the terminal data processing device 5 to various external devices. The near-distance communication circuit 519 is a communication circuit that communicates in compliance with the near field radio communication (NFC) (Registered Trademark), the Bluetooth (Registered Trademark), and the like. The touch panel 521 is an example of input device that enables the user to input a user instruction for operating the terminal data processing device 5 through touching a screen of the display 517.

The terminal data processing device 5 further includes a bus line 510. The bus line 510 may be an address bus or a data bus, which electrically connects various elements such as the CPU 501 of FIG. 5.

<Hardware Configuration of Centralized Data Processing Server>

Figure 6:
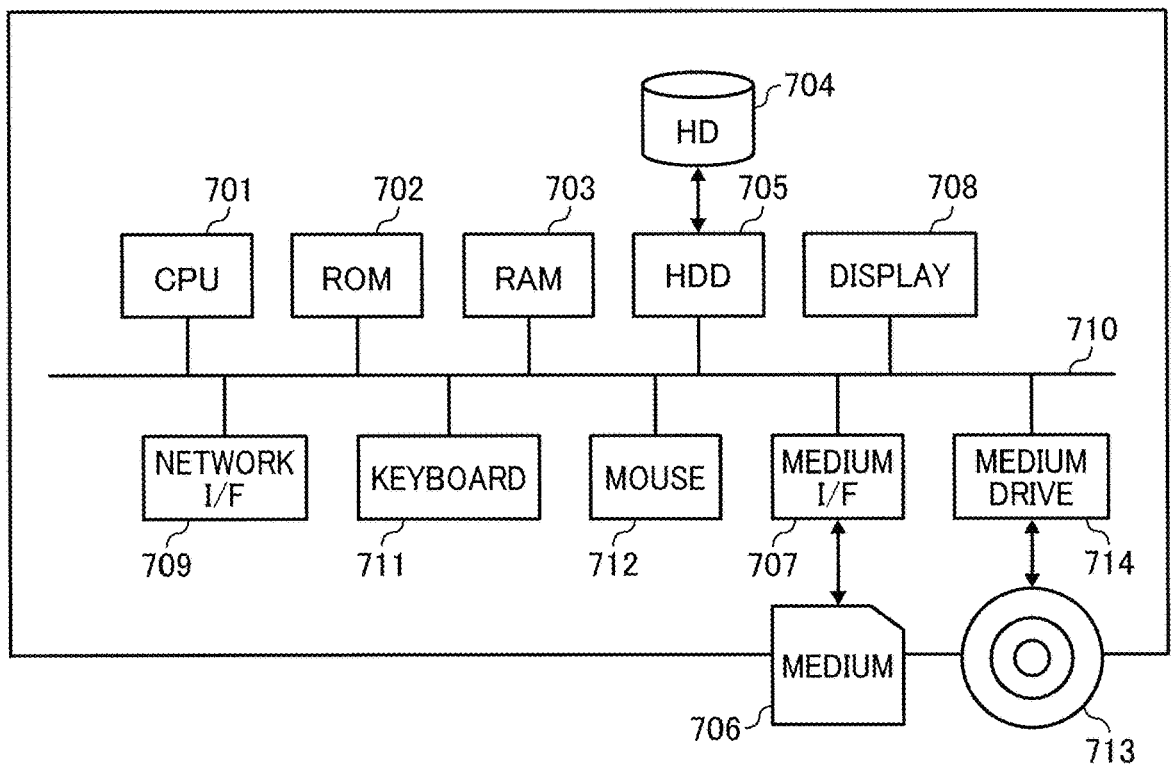
FIG. 6 is a schematic diagram illustrating a hardware configuration of any one of centralized data processing server, service providing server, and authentication server, according to the embodiment.

FIG. 6 is a schematic diagram illustrating a hardware configuration of any one of the centralized data processing server 7, the service providing server 8, and the authentication server 9, according to the embodiment. Since the centralized data processing server 7, the service providing server 8, and the authentication server 9 are substantially the same in hardware configuration, an example case of the centralized data processing server 7 is described below, while omitting the description of the service providing server 8 and the authentication server 9.

FIG. 6 is a schematic diagram illustrating a hardware configuration of the centralized data processing server 7, according to the embodiment. Referring to FIG. 6, the centralized data processing server 7, which is implemented by the general-purpose computer, includes a CPU 701, a ROM 702, a RAM 703, a hard disk (HD) 704, a hard disk drive (HDD) 705, a medium I/F 707, a display 708, a network I/F 709, a keyboard 711, a mouse 712, a medium drive 714, and a bus line 710. Since the centralized data processing server 7 operates as a server, an input device such as the keyboard 711 and the mouse 712, or an output device such as the display 708 does not have to be provided.

The CPU 701 controls entire operation of the centralized data processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network IN 709 is an interface that controls communication of data with an external device through the Internet 600. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The medium drive 714 reads or writes various data with respect to an optical disc 713 such as a Compact Disc ReWritable (CD-RW), DVD, and Blue-Ray disc, as an example of removable recording medium.

The centralized data processing server 7 further includes a bus line 710. The bus line 710 is an address bus or a data bus, which electrically connects the elements in FIG. 6 such as the CPU 701. The service providing server 8 and the authentication server 9 each have the same hardware configuration as described above.

<<Software Configuration>>

Figure 7:
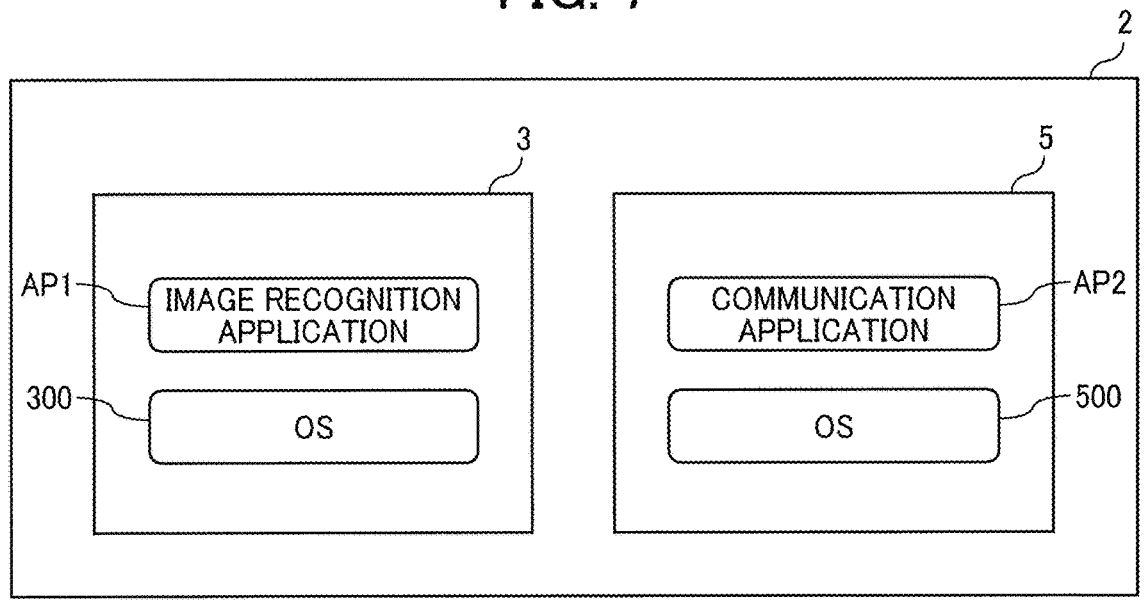
FIG. 7 is a schematic diagram illustrating a software configuration of the real-time data processing terminal and the terminal data processing device, according to the embodiment.

FIG. 7 is a schematic diagram illustrating a software configuration of the real-time data processing terminal 3 and the terminal data processing device 5, which together operate as the image acquisition terminal 2, according to the embodiment.

As illustrated in FIG. 7, the real-time data processing terminal 3 includes OS 300, and image recognition application AP1. The image recognition application AP1 is deployed in a work area, such as the RAM 303 of the real-time data processing terminal 3. The OS 300 is basic software that controls entire operation of the real-time data processing terminal 3 through providing basic functions. The image recognition application AP1 is an application for recognizing faces of people, animals, etc. from the captured images.

The terminal data processing device 5 includes OS 500 and communication application AP2. The communication application AP2 is deployed in a work area, such as the RAM 503 of the terminal data processing device 5. The OS 500 is basic software that controls entire operation of the terminal data processing device 5 through providing basic functions. The communication application AP2 is an application for communicating with another terminal (device) such as the distributed data processing terminal 6.

In the image acquisition terminal 2, while the real-time data processing terminal 3 performs image recognition, the terminal data processing device 5 communicates with the distributed data processing terminal 6 via the intranet 200 to perform distributed processing to transmit the partial image data as data to be verified, or receive a verification result.

Note that the real-time data processing terminal 3 and the terminal data processing device 5 are each installed with not only the OS but also a driver, a software development kit (SDK), or an application programming interface (API) that may be different between the real-time data processing terminal 3 and the terminal data processing device 5.

Referring to FIGS. 8 to 17, a functional configuration of the communication system 1 is described according to an embodiment.

<<Functional Configuration>>

Figure 8:
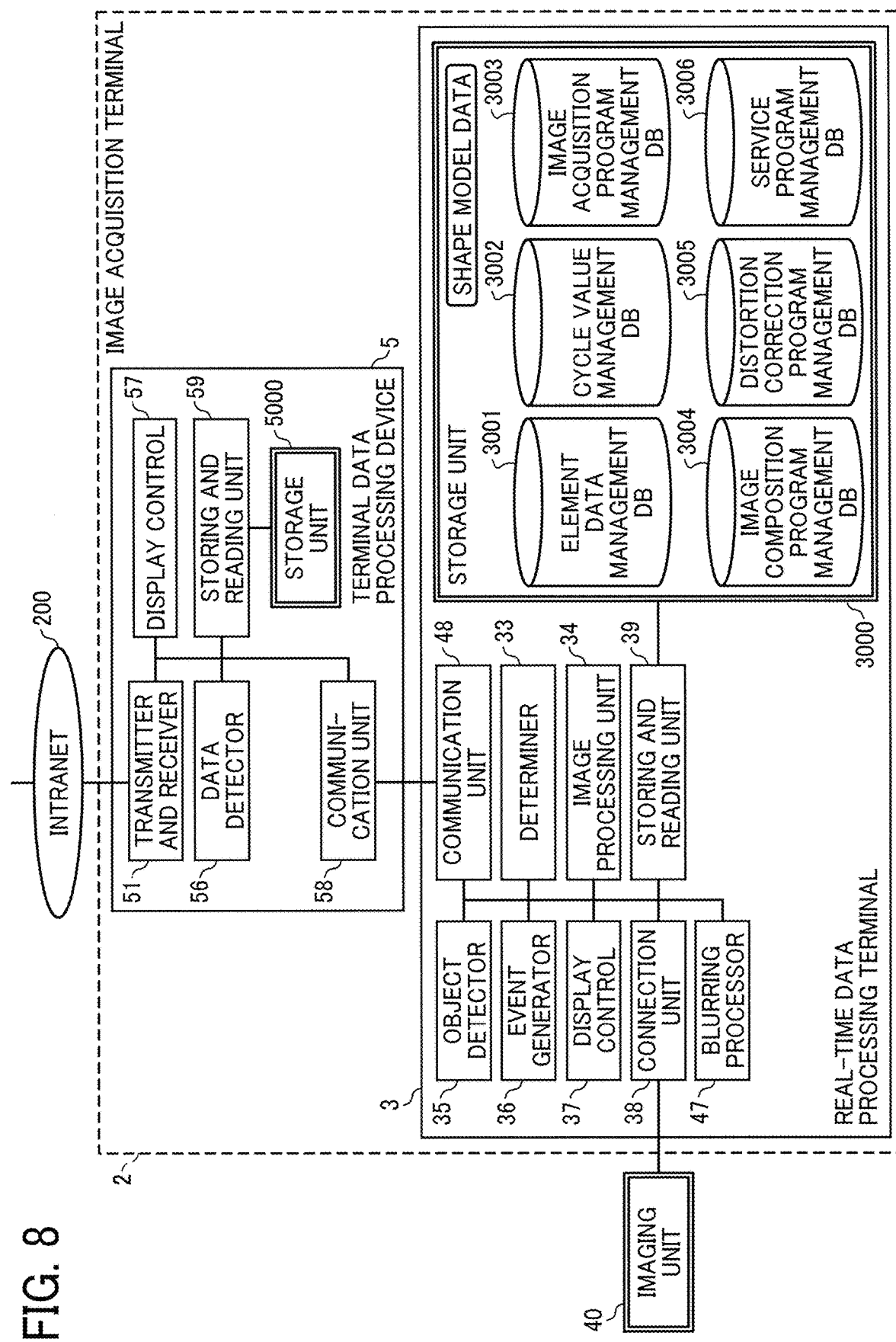
FIG. 8 is a schematic block diagram illustrating a functional configuration of the communication system of FIG. 1, specifically, the image acquisition terminal, according to the embodiment.
Figure 9:
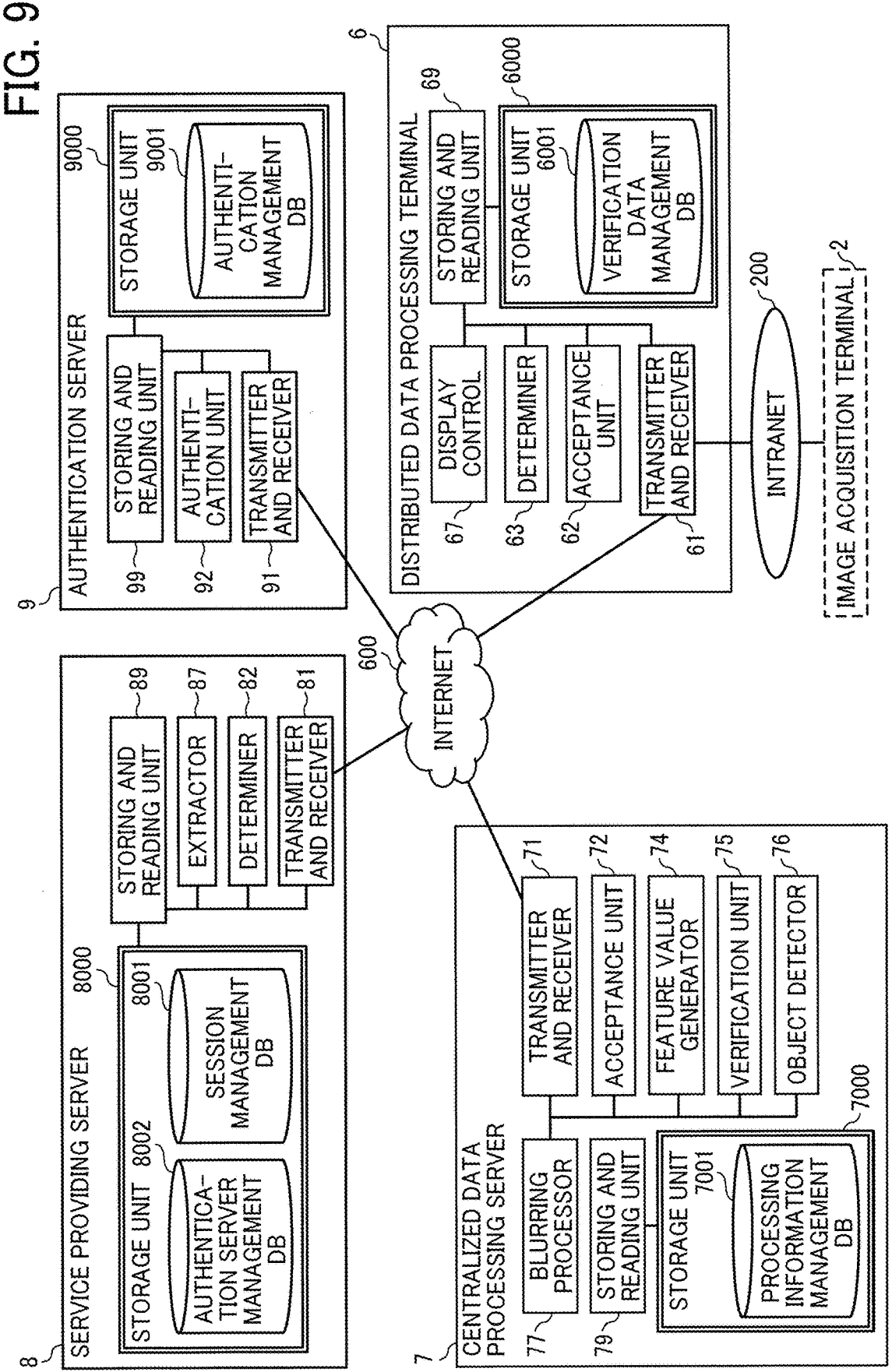
FIG. 9 is a schematic diagram illustrating a functional configuration of the communication system of FIG. 1, specifically, the service providing server, authentication server, distributed data processing terminal, and centralized data processing server, according to the embodiment.

First, referring to FIG. 8 to FIG. 17, functional configurations of terminals, apparatuses, and servers in the communication system 1 are described, according to the embodiment. FIGS. 8 and 9 are a schematic block diagram illustrating a functional configuration of the communication system 1 according to the first embodiment. FIG. 8 specifically illustrates a functional configuration of the image acquisition terminal 2 in the communication system 1.

<Functional Configuration of Real-Time Data Processing Terminal>

Referring to FIG. 8, the real-time data processing terminal 3 includes a determiner 33, an image processing unit 34, an object detector 35, an event generator 36, a display control 37, a connection unit 38, a storing and reading unit 39, a blurring processor 47, and a communication unit 48. These units are functions that are implemented by or that are caused to function by operating any of the hardware components illustrated in FIG. 2 in cooperation with the instructions of the CPU 301 according to the control program expanded from the EEPROM 304 to the RAM 303.

The real-time data processing terminal 3 further includes a storage unit 3000, which is implemented by the ROM 302, the RAM 303, and/or the EEPROM 304 illustrated in FIG. 2. The storage unit 3000 stores therein shape model data, which is described below. The storage unit 3000 further stores an imaging element data management DB 3001, a cycle value management DB 3002, an image acquisition program management DB 3003, an image composition program management DB 3004, a distortion correction program management DB 3005, and a service program management DB 3006.

The imaging element data management DB 3001 is implemented by an imaging element data management table, which is described below referring to FIG. 10A. The cycle value management DB 3002 is implemented by a cycle value management table, which is described below referring to FIG. 10B. The image acquisition program management DB 3003 is implemented by an image acquisition program management table, which is described below referring to FIG. 11A. The image composition program management DB 3004 is implemented by an image composition program management table, which is described below referring to FIG. 11B. The distortion correction program management DB 3005 is implemented by a distortion correction program management table, which is described below referring to FIG. 11C. The service program management DB 3006 is implemented by a service program management table, which is described below referring to FIG. 11D.

(Imaging Element Data Management Table)

FIG. 10A is a conceptual diagram of an example of imaging element data management table. The imaging element data management table stores, for each one or more types of imaging unit 40, a model number of the imaging unit 40, the number of imaging elements included in the imaging unit 40, and a type of one or more lenses in the imaging unit 40, in association with one another. The model number is an example of type information indicating a type of the imaging unit 40 that is determined by the difference in number of imaging elements or type of lenses. In alternative to the model number, an identifier of the imaging unit 40 such as a product number, a bar code, etc. may be used, as long as such identifier is able to determine a number of imaging elements and/or a lens type of the imaging unit 40.

(Cycle Value Management Table)

FIG. 10B is a conceptual diagram illustrating an example of cycle value management table. The cycle value management table stores a number of imaging elements in the imaging unit 40 and a cycle value (frames per second) indicating a cycle time of the object recognition process, which will be described later, in association.

The tables of FIGS. 11A to 11C are each used for managing whether or not an appropriate program is installed in the real-time data processing terminal 3, depending on a model number of the real-time data processing terminal 3.

(Image Acquisition Program Management Table)

FIG. 11A is a conceptual diagram of an example of image acquisition program management table. The image acquisition program management table stores a number of imaging elements in the imaging unit 40 and an identifier of an image acquisition program (such as a name) to be installed in the real-time data processing terminal 3 to process data of the imaging unit 40 having a specific number of imaging elements, in association with flag information indicating whether that image acquisition program is installed ("install" field). For example, in case an image acquisition program is installed in the real-time data processing terminal 3 for processing data of the imaging unit 40 having one imaging element, the program name "ProgC01 (1 system)" and the flag information "1" are stored in association with the number of imaging elements "1". Similarly, in case an image acquisition program is installed in the real-time data processing terminal 3 for processing data of the imaging unit 40 having two imaging elements, the program name "ProgC02 (2 systems)" and the flag information "1" are stored in association with the number of imaging elements "2". In case no program is installed, the program name and the flag information "0" indicating that program is not installed are stored in association with the number of imaging elements.

(Image Composition Program Management Table)

FIG. 11B is a conceptual diagram illustrating an example of image composition program management table. The image composition program management table stores a number of imaging elements in the imaging unit 40 and an identifier of an image composition program (such as a name) to be installed in the real-time data processing terminal 3 to process data of the imaging unit 40 having a specific number of imaging elements, in association with flag information indicating whether the image composition program is installed ("install" field). For example, in case an image composition program is installed in the real-time data processing terminal 3 for processing data of the imaging unit 40 having a single imaging element, the program name "ProgS01 (image composition)" and the flag information "1" are stored in association with the number of imaging element "1". For instance, the program identified with "ProgS01 (image composition)" is used to combine images, which are sequentially obtained using the one imaging unit. Similarly, in case an image composition program is installed in the real-time data processing terminal 3 for processing data of the imaging unit 40 having two imaging elements, the program name "ProgS02 (image composition)" and the flag information "1" are stored in association with the number of imaging elements "2". In case no program is installed, the program name and the flag information "0" indicating that program is not installed are stored in association with the number of imaging elements. In alternative example, since composition (combining) of images is not necessary for the imaging unit 40 with one imaging element, no program name may be managed.

(Distortion Correction Program Management Table)

FIG. 11C is a conceptual diagram illustrating an example of distortion correction program management table. The distortion correction program management table stores a type of the lens in the imaging unit 40 and an identifier of the distortion correction program (such as the name) to be installed in the real-time data processing terminal 3 to process data of the imaging unit 40 having a specific lens type, in association with flag information indicating whether the distortion correction program is installed ("install" field). For example, in case a distortion correction program is installed in the real-time data processing terminal 3 for processing data of the imaging unit 40 having the wide-angle lens, the program name "ProgW01 (wide-angle correction)" and the flag information "1" are stored in association with the lens type "wide-angle lens". Similarly, in case a distortion correction program is installed in the real-time data processing terminal 3 for processing data of the imaging unit 40 having the fish-eye lens, the program name "ProgW02 (fish-eye correction)" and the flag information "1" are stored in association with the lens type "fish-eye lens". In case no program is installed, the program name and the flag information "0" indicating that program is not installed are stored in association with the type of imaging elements.

(Service Program Management Table)

FIG. 11D is a conceptual diagram illustrating an example of service program management table. The table of FIG. 11D is used for determining whether a specific program is installed at the image acquisition terminal 2 (in this case, the real-time data processing terminal 3) to perform a specific service, based on authentication of the image acquisition terminal 2 (or the user operating the image acquisition terminal 2) by the authentication server 9. The service program management table stores an authentication server ID for identifying an authentication server for providing a specific service and an identifier (such as a name of the program) of a service program for providing the specific service to the image acquisition terminal 2, in association with flag information indicating whether the service program is installed ("install" field). For example, in case an object recognition program is installed in the real-time data processing terminal 3, which is authenticated by the authentication server for providing an object recognition service, the program name "Prog D01 (object recognition)" and the flag information "1" are stored in association with the authentication server ID "a01" of the authentication server providing the object recognition service. Similarly, in case an object blurring program is installed in the real-time data processing terminal 3, which is authenticated by the authentication server for providing an object blurring service, the program name "Prog D02 (object blurring)" and the flag information "1" are stored in association with the authentication server ID "a02" of the authentication server providing the object counting service. In case no program is installed, the program name and the flag information "0" indicating that program is not installed are stored in association with the authentication server ID.

In providing the object blurring service, a sequence of processing is performed, which includes applying blurring processing to captured image data, and storing processed image data. The blurring processing may be performed by the centralized data processing server 7 (S108 of FIG. 24), or by the real-time data processing terminal 3 (S123 of FIG. 25). The storing processing is performed by the centralized data processing server 7.

As described above, some application programs, like the programs described above referring to FIGS. 11A to 11C, are installed at the image acquisition terminal 2, for example, when an imaging unit 40 is newly detected or the image acquisition terminal 2 is newly registered to a system. Once such application programs are installed, authentication of the user using the image acquisition terminal 2 (or the distributed data processing terminal 6 that manages the image acquisition terminal 2) to use such application programs is not necessary, as none of these application programs referring to FIGS. 11A to 11C handles information that can identify a user.

On the other hand, some application programs, like the programs described above referring to FIG. 11D, are installed at the image acquisition terminal 2 when a specific service related to identification of a user is requested. Even when such application programs are installed based on authentication, authentication of user using the image acquisition terminal 2 (or the distributed data processing terminal 6 that manages the image acquisition terminal 2) to use such application programs is necessary, as these application programs referring to FIG. 11D handles user-specific information that can identify a user, such as a facial image of the user and a name of the user.

While it is possible that the communication system 1 allows the image acquisition terminal 2 to execute various types of application programs only when the image acquisition terminal 2 is authenticated as an authorized terminal, performing authentication processing for each of the application programs to be executed is cumbersome, resulting in the increase in processing load. This may result in delay in overall processing, which is not desirable especially for the communication system 1 that may be used to detect a suspicious person in which real-time data processing is preferable.

In view of this, the communication system 1 described in this disclosure performs authentication processing only for the application programs that are previously determined as authentication processing is needed, such as the application programs that handle user-specific information. Accordingly, processing of image data, which is acquired at the image acquisition terminal 2, is performed in real time, while still maintaining the security level.

(Functional Configuration of Real-Time Data Processing Terminal)

Referring to FIG. 8, a functional configuration of the real-time data processing terminal 3 is described according to the embodiment.

The determiner 33, which is implemented by instructions of the CPU 301, performs various determinations. For example, the determiner 33 refers to the imaging element data management DB 3001 to determine a number of imaging elements or a lens type of the imaging unit 40 having the model type sent from the imaging unit 40.

The image processing unit 34, which is implemented by the instructions of the CPU 301, performs various types of image processing according to one or more programs (image acquisition program, image composition program, distortion correction program, and service program), which are managed using the tables described above referring to FIGS. 11A to 11D. More specifically, the image processing unit 34 executes a first program (for example, an image acquisition program, an image composition program, and a distortion correction program) that does not require authentication for obtaining, to apply first image processing (for example, image acquisition, image composition, and distortion correction) to image data such as captured image data. The image processing unit 34 further executes a second program (for example, a service program) that requires authentication for obtaining, to apply second image processing (for example, object recognition, and object blurring) to image data such as captured image data.

The captured image data to be applied with image processing, contains a detection target as described above. For example, the object detector 35, which is implemented by instructions of the CPU 301, detects feature points as a candidate for a specific object such as a human face in the captured image obtained from the imaging unit 40 via the connection unit 38, and refers to the shape model data indicating a shape model of the specific object (such as the human face) to detect the coordinates of the specific object in the captured image. Any desired known method may be used to detect the specific object. Accordingly, the object detector 35 detects (extracts) a rectangular-shaped object area image including the object such as the face, from the captured image. In the following, a facial area image is one example of the rectangular-shaped object area image including the object.

The event generator 36, which is implemented by the instructions of the CPU 301, generates detection data (event data) indicating detection of a specific object, for example, when the coordinates of a specific object are specified by the image processing unit 34.

The display control 37, which is implemented by the instructions of the CPU 301, controls the display 317 to display various screens.

The connection unit 38, which is implemented by the imaging unit I/F 313 and the instructions of the CPU 301, is an interface for mechanically and electrically connecting the imaging unit 40 to the real-time data processing terminal 3.

The storing and reading unit 39, which is implemented by instructions of the CPU 301, stores various data or information in the storage unit 3000 or reads out various data or information from the storage unit 3000.

The blurring processor 47, which is implemented by instructions of the CPU 301 under control of object blurring program, applies blurring processing to a part of or entire image received at the transmitter and receiver 41.

The communication unit 48, which may be implemented by the instructions of the CPU 301 and the external device connection I/F 318, transmits or receives various data (or information) to or from the communication unit 58 of the terminal data processing device 5. The one-to-one communication between the communication unit 48 and the communication unit 58 may be performed via a wired network or a wireless network.

<Functional Configuration of Terminal Data Processing Device>

As illustrated in FIG. 8, the terminal data processing device 5 includes a transmitter and receiver 51, a data detector 56, a display control 57, a communication unit 58, and a storing and reading unit 59. These units are functions that are implemented by or that are caused to function by operating any of the elements illustrated in FIG. 5 in cooperation with the instructions of the CPU 501 according to the control program expanded from the EEPROM 504 to the RAM 503.

The terminal data processing device 5 further includes a storage unit 5000, which is implemented by the ROM 502, RAM 503 and EEPROM 504 illustrated in FIG. 5.

(Functional Configuration of Terminal Data Processing Device)

Referring to FIG. 8, a functional configuration of the terminal data processing device 5 is described according to the embodiment.

The transmitter and receiver 51 of the terminal data processing device 5, which is implemented by the far-distance communication circuit 511, the antenna 511a, and the instructions of the CPU 501, transmits or receives various data (or information) to or from the distributed data processing terminal 6 via a communication network (the intranet 200).

The data detector 56, which is implemented by the instructions of the CPU 501, detects whether or not an event has occurred that triggers reception of data from the real-time data processing terminal 3, and whether or not the reception of data is completed. The data detector 56 further identifies a service requested by the user based on information transmitted from the distributed data processing terminal 6 such as an authentication server ID or a service name.

The display control 57, which is implemented by the instructions of the CPU 501, controls the display 517 to display various screens.

The communication unit 58, which may be implemented by the instructions of the CPU 501 and the external device connection I/F 518, transmits or receives various data (or information) to or from the communication unit 48 of the real-time data processing terminal 3.

The one-to-one communication between the communication unit 58 and the communication unit 48 may be performed via a wired network or a wireless network.

The storing and reading unit 59, which is implemented by instructions of the CPU 501, stores various data or information in the storage unit 5000 or reads out various data or information from the storage unit 5000.

<Functional Configuration of Distributed Data Processing Terminal>

As illustrated in FIG. 9, the distributed data processing terminal 6 includes a transmitter and receiver 61, an acceptance unit 62, a determiner 63, a display control 67, and a storing and reading unit 69. These units are functions that are implemented by or that are caused to function by operating any of the elements illustrated in FIG. 5 in cooperation with the instructions of the CPU 501 according to the control program expanded from the EEPROM 504 to the RAM 503 in the distributed data processing terminal 6.

The distributed data processing terminal 6 further includes a storage unit 6000, which is implemented by the ROM 502, RAM 503 and EEPROM 504 illustrated in FIG. 5. The storage unit 6000 stores verification data. The storage unit 6000 further stores a verification data management DB 6001. The verification data management DB 6001 is implemented by a verification data management table, which will be described below referring to FIG. 13. The verification data may be stored in a memory of any data management server other than the distributed data processing terminal 6.

(Verification Data Management Table)

FIG. 13 is a conceptual diagram illustrating the verification data management table according to the embodiment. The verification data management table stores, for each one of a plurality of persons to be verified, a file name of an image file (such as a facial image) as the verification data and a name of a person identified with a facial image.

(Functional Configuration of Distributed Data Processing Terminal)

The transmitter and receiver 61 of the distributed data processing terminal 6, which is implemented by the far-distance communication circuit 511, the antenna 511a, and the instructions of the CPU 501, transmits or receives various data (or information) to or from the centralized data processing server 7 via a communication network (the Internet 600). For example, the transmitter and receiver 61 transmits a verification request for verifying the data to be verified using the verification data, to the centralized data processing server 7, or performs processing on the verification result sent from the centralized data processing server 7. The transmitter and receiver 61 transmits or receives various data (or information), such as the data to be verified, to or from the image acquisition terminal 2 via the communication network (such as the intranet 200).

The acceptance unit 62 is implement by the touch panel 521 of the distributed data processing terminal 6, which operates under control of the CPU 501, to receive various selections or inputs from the user.

The determiner 63, which is implemented by instructions of the CPU 501 of the distributed data processing terminal 6, performs various determinations.

The display control 67, which is implemented by the instructions of the CPU 501 of the distributed data processing terminal 6, controls the display 517 to display various screens.

The storing and reading unit 69, which is implemented by instructions of the CPU 501 of the distributed data processing terminal 6, stores various data or information in the storage unit 6000 or reads out various data or information from the storage unit 6000. For example, the storing and reading unit 69 stores the verification data (in this case, the facial image data) in the storage unit 6000 according to a registration request received at the acceptance unit 62.

<Functional Configuration of Centralized Data Processing Server>

As illustrated in FIG. 9, the centralized data processing server 7 includes a transmitter and receiver 71, an acceptance unit 72, a feature value generator 74, a verification unit 75, an object detector 76, a blurring processor 77, and a storing and reading unit 79. These units are functions that are implemented by or that are caused to function by operating any of the elements illustrated in FIG. 6 in cooperation with the instructions of the CPU 701 according to the control program expanded from the HD 704 to the RAM 703 in the centralized data processing server 7.

The centralized data processing server 7 further includes a storage unit 7000, which is implemented by the ROM 702, the RAM 703 and the HD 704 illustrated in FIG. 6. The storage unit 7000 includes a processing information management DB 7001, which is implemented by a processing information management table as described below. The further storage unit 7000 stores feature value data to be used for verification, which will be described below.

(Processing Information Management Table)

The storing unit 7000 of the centralized data processing server 7 stores therein one or more processing information management tables, which are provided to manage processing to be performed by at least the real-time data processing terminal 3 in providing a specific service. While the tables illustrated in FIGS. 12A to 12C are described in this example, the tables stored in the storing unit 7000 differ depending on specific services to be provided by at least the real-time data processing terminal 3.

FIG. 12A illustrates an information processing management table for object (face) recognition service, which stores information on processing to be performed (referred to as processing information) in providing the object recognition service, in association with a service name "object recognition". In this example, the items of processing information include information on whether object detection (such as face detection) is to be executed, a number of horizontal pixels of the facial area image, a number of vertical pixels of the facial area image, and a projection method applied to the facial area image.

FIGS. 12B and 12C each illustrate an information processing management table for object blurring service, which stores information on processing to be performed (processing information) in providing the object blurring service, in association with a service name "object blurring". In this example, the items of processing information include information on whether the object blurring (such as face blurring) is to be executed by the real-time data processing terminal 3, a number of horizontal pixels of a captured image, a number of vertical pixels of the captured image, and a projection method applied to the captured image. When the blurring processing is not to be executed at the real-time data processing terminal 3 ("OFF" in FIG. 12B), blurring processing is to be executed at the centralized data processing server 7. Alternatively, when the blurring processing is to be executed at the real-time data processing terminal 3 ("ON" in FIG. 12C), blurring processing is not executed at the centralized data processing server 7. In either case of executing blurring processing at the real-time data processing terminal 3 or the centralized data processing server 7, image data that has been processed is stored in the centralized data processing server 7.

In case the centralized data processing server 7 having relatively high processing capability is used compared to processing capability of the real-time data processing terminal 3, the table of 12B is previously stored in the processing information management DB 7001. In case the centralized data processing server 7 having relatively low processing capability is used compared to processing capability of the real-time data processing terminal 3, the table of 12C is previously stored in the processing information management DB 7001. That is, the value of object blurring item is previously set, depending on processing capability of the centralized data processing server 7 (cloud) compared to processing capability of the real-time data processing terminal 3 (edge-node).

The processing capability may be determined based on a number of operation frequency of the CPU, whether a hardware accelerator is installed, etc.

(Functional Configuration of Centralized Data Processing Server)

The transmitter and receiver 71 of the centralized data processing server 7, which is implemented by the network I/F 709 and the instructions of the CPU 701, transmits or receives various data (or information) to or from the distributed data processing terminal 6 via a communication network (the Internet 600). For example, the transmitter and receiver 71 receives a verification request for verifying the data to be verified using the verification data, from the distributed data processing terminal 6, or sends the verification result to the distributed data processing terminal 6.

The acceptance unit 72 is implemented by the keyboard 711 or mouse 712, which operates under control of the CPU 701, to receive various selections or inputs from the user.

The feature value generator 74, which is implemented by the instructions of the CPU 701, generates parameters of feature values from the data to be verified (partial image data) and the verification data that are received at the transmitter and receiver 71.

The verification unit 75, which is implemented by the instructions of the CPU 701, compares the feature values between the verification data and the data to be verified, using the feature values obtained at the feature value generator 74, to calculate a score (in points) indicating the similarity in feature values.

The object detector 76, which is implemented by the instructions of the CPU 701, detects a specific object (for example, a human face) in the captured image received at the transmitter and receiver 71.

The blurring processor 77, which is implemented by the instructions of the CPU 701, applies blurring processing to a part of or entire image received at the transmitter and receiver 71. The object detector 76 and the blurring processor 77 are provided, when the object blurring program is installed at the centralized data processing server 7 to perform blurring processing (i.e., when the processing information management DB 7001 stores the processing information management table of FIG. 12B). If the centralized data processing server 7 does not perform blurring processing (i.e., when the processing information management DB 7001 stores the processing information management table of FIG. 12A), the object detector 76 and the blurring processor 77 do not have to be provided.

The storing and reading unit 79, which is implemented by the instructions of the CPU 701, stores various data or information in the storage unit 7000 or reads out various data or information from the storage unit 7000.

<Functional Configuration of Service Providing Server>

Next, referring to FIGS. 9, 14 to 16, each functional unit of the service providing server 8 is described in detail. As illustrated in FIG. 9, the service providing server 8 includes a transmitter and receiver 81, a determiner 82, an extractor 87, and a storing and reading unit 89. These units are functions that are implemented by or that are caused to function by operating any of the elements illustrated in FIG. 6 in cooperation with the instructions of the CPU 701 according to the service providing program expanded from the HD 704 to the RAM 703.

The service providing server 8 further includes a storage unit 8000, which is implemented by the RAM 703 and the HD 704 illustrated in FIG. 6. The storage unit 8000 stores various data transmitted from the distributed data processing terminal 6 or the authentication server 9. The storage unit

8000 stores all of the programs, which is determined according to the tables referring to FIGS. 11A to 11D. In response to a request from the real-time data processing terminal 3, the service providing server 8 transmits the requested program for installation to the real-time data processing terminal 3.

The storage unit 8000 further includes a session management DB 8001 and an authentication server management DB 8002. The session management DB 8001 is implemented by a session management table, which is described below referring to FIG. 14. The authentication server management DB 8002 is implemented by an authentication server management table, which is described below referring to FIG. 16. Each table will be described in detail below.

(Session Management Table)

FIG. 14 is a conceptual diagram of an example of session management table. The session management table of FIG. 14 manages a session to be used for providing various types of services (that is, various types of programs for executing the services) to the distributed data processing terminal 6 managing the image acquisition terminal 2. The session management table stores a session ID for identifying a communication session established with the distributed data processing terminal 6, a terminal ID for identifying the distributed data processing terminal 6, and an IP address of the distributed data processing terminal 6 operated by the user identified with the terminal ID, in association. Here, the terminal ID may be any identifier for identifying the user operating the distributed data processing terminal 6, or the distributed data processing terminal 6 itself. In the following example, the terminal ID includes a user ID identifying the user operating the distributed data processing terminal 6.

Figure 15A:
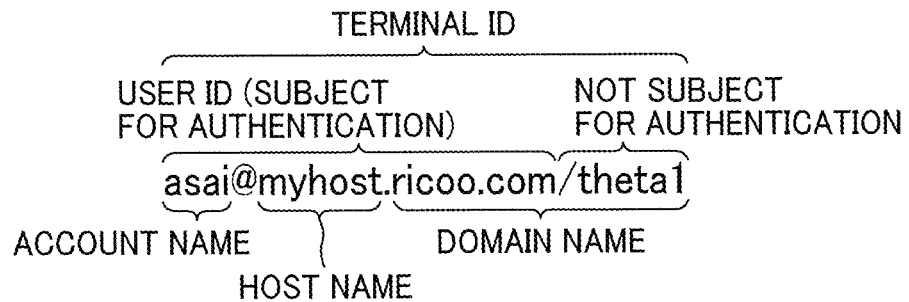
FIGS. 15A, 15B, and 15C are each a conceptual diagram illustrating an example of terminal identifier.
Figure 15B:
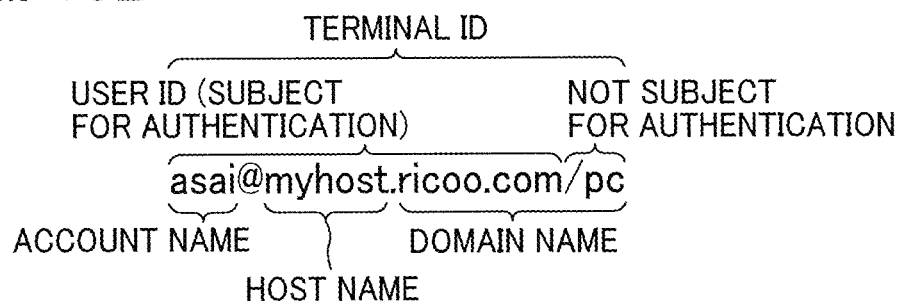
Figure 15C:
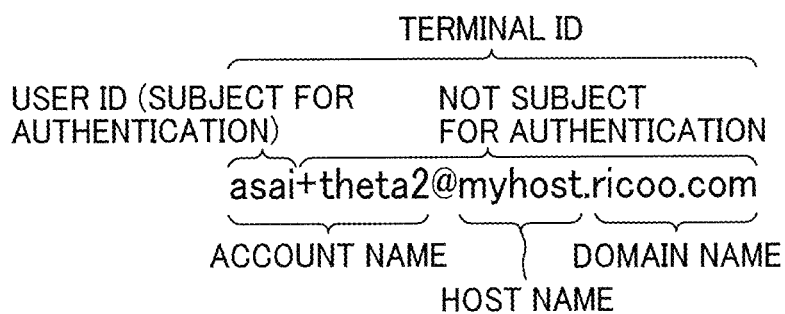

FIGS. 15A, 15B, and 15C each illustrate an email address as an example of the terminal ID, which can be classified into a part to be authenticated (subject for authentication) and a part not to be authenticated (not subject for authentication). More specifically, in the following examples, the email address, as an example of the terminal ID, includes a user ID. A part or entire user ID is used for authentication. The part subject for authentication is a user ID to be used for authentication by the authentication server 9. The part not subject for authentication is any part other than the user ID, which is not to be used for authentication by the authentication server 9.

Referring to a first example case of FIG. 15A, the part subject for authentication includes an account name "asai", a host name "myhost" and a domain name "ricoo.com". The part not subject or authentication includes "theta1", which is any remaining part of the email address. In such case, the extractor 87 distinguishes between the part subject for authentication and the part not subject for authentication by "/".

The email address of FIG. 15B can be classified into the part subject for authentication and the part not subject for authentication, similar to that of FIG. 15A, except that the part not subject for authentication differs. Specifically, the authentication server 9 recognizes that the terminal ID of FIG. 15B is the same as that of FIG. 15A, as the part subject for authentication is the same, even when the part not subject for authentication differs.

Alternatively, the terminal ID may be authenticated according to a second example case illustrated in FIG. 15C. Referring to the second example case of FIG. 15C, the part subject for authentication includes a front part of an account name, that is, "asai". The part not subject for authentication includes "theta2", which is any remaining part of the account name, and a host name "myhost", and a domain name "ricoo.com". In such case, the extractor 87 distinguishes between the part subject for authentication and the part not subject for authentication by "+".

(Authentication Server Management Table)

FIG. 16 is a conceptual diagram of an example of authentication server management table. The authentication server management table stores, for each authentication server 9, an authentication server ID identifying the authentication server 9 and a URL (Uniform Resource Locator) for accessing the authentication server 9 in association.

(Each Functional Unit of Service Providing Server)

Next, referring to FIG. 9, each functional unit of the service providing server 8 is described in detail.

The transmitter and receiver 81 of the service providing server 8, which may be implemented by the instructions from the CPU 701, and the network I/F 709, illustrated in FIG. 6, transmits or receives various data (or information) to or from the distributed data processing terminal 6 or the authentication server 9 through the communication network (such as the Internet 600).

The determiner 82, which is implemented by instructions from the CPU 701 illustrated in FIG. 6, determines, for example, whether or not a communication session for providing a service to the distributed data processing terminal 6 has already been established.

The extractor 87, which is implemented by instructions from the CPU 701 illustrated in FIG. 6, extracts a user ID (part subject for authentication) from the terminal ID as illustrated in FIGS. 15A to 15C.

The storing and reading unit 39, which is implemented by instructions from the CPU 701 and the HDD 705, illustrated in FIG. 6, stores various data or information in the storage unit 8000 or reads out various data or information from the storage unit 8000.

<Functional Configuration of Authentication Server>

Next, referring to FIGS. 9 and 17A to 17C, each functional unit of the authentication server 9 is described in detail. The authentication server 9 includes a transmitter and receiver 91, an authentication unit 92, and a storing and reading unit 99. These units are functions that are implemented by or that are caused to function by operating any of the elements illustrated in FIG. 6 in cooperation with the instructions of the CPU 701 according to the authentication server program expanded from the HD 704 to the RAM 703.

The authentication server 9 further includes a storage unit 9000, which is implemented by the RAM 703 and the HD 704 illustrated in FIG. 6. The storage unit 9000 stores various data transmitted from the distributed data processing terminal 6 or the service providing server 8.

The storage unit 9000 further stores an authentication management DB 9001. The authentication management DB 9001 is implemented by an authentication management table, which is described below. The authentication management table will be described in detail below.

(Authentication Management Table)

FIG. 17A is a conceptual diagram of an example of authentication management table stored in the authentication server 9a. FIG. 17B is a conceptual diagram of an example of authentication management table stored in the authentication server 9b. FIG. 17C is a conceptual diagram of an example of authentication management table stored in the authentication server 9c.

The authentication management table stores, for each user being managed, a user ID (the part subject for authentication) for identifying the user, and a password, in association. In this example, the user ID is a part of the terminal ID, which is subject for authentication, as described above referring to FIGS. 14A to 14C. The password is previously set by the user identified with the user ID.

(Each Functional Unit of Authentication Server)

Next, referring to FIG. 9, each functional unit of the authentication server 9 is described in detail.

The transmitter and receiver 91 of the authentication server 9, which is implemented by the instructions from the CPU 701 and the network I/F 709, transmits or receives various data (or information) to or from the distributed data processing terminal 6 and the service providing server 8 via the communication network (the Internet 600).

The authentication unit 92, which is implemented by the instructions from the CPU 701 illustrated in FIG. 6, authenticates the ID (such as the terminal ID) of the distributed data processing terminal 6, based on a determination of whether or not the image acquisition terminal 2 that has transmitted the authentication request has an authority to receive a service. Such authentication is performed because the distributed data processing terminal 6 manages the image acquisition terminal 2. That is, in one example, the distributed data processing terminal 6 manages a plurality of image acquisition terminals 2, which may be distributed over different places, but within a same local area. In such case, the user (usually, the operator) of the distributed data processing terminal 6 is given an authorization to install or use some application programs (that is, services) that require authentication.

The storing and reading unit 99, which is implemented by the instructions of the CPU 701 and the HDD 705, illustrated in FIG. 6, stores various data or information in the storage unit 9000 or reads out various data or information from the storage unit 9000.

<<Operation>>

Referring now to FIGS. 18 to 26, operation performed by the communication system 1 is described according to the embodiment.

<Authentication Processing>

Figure 18:
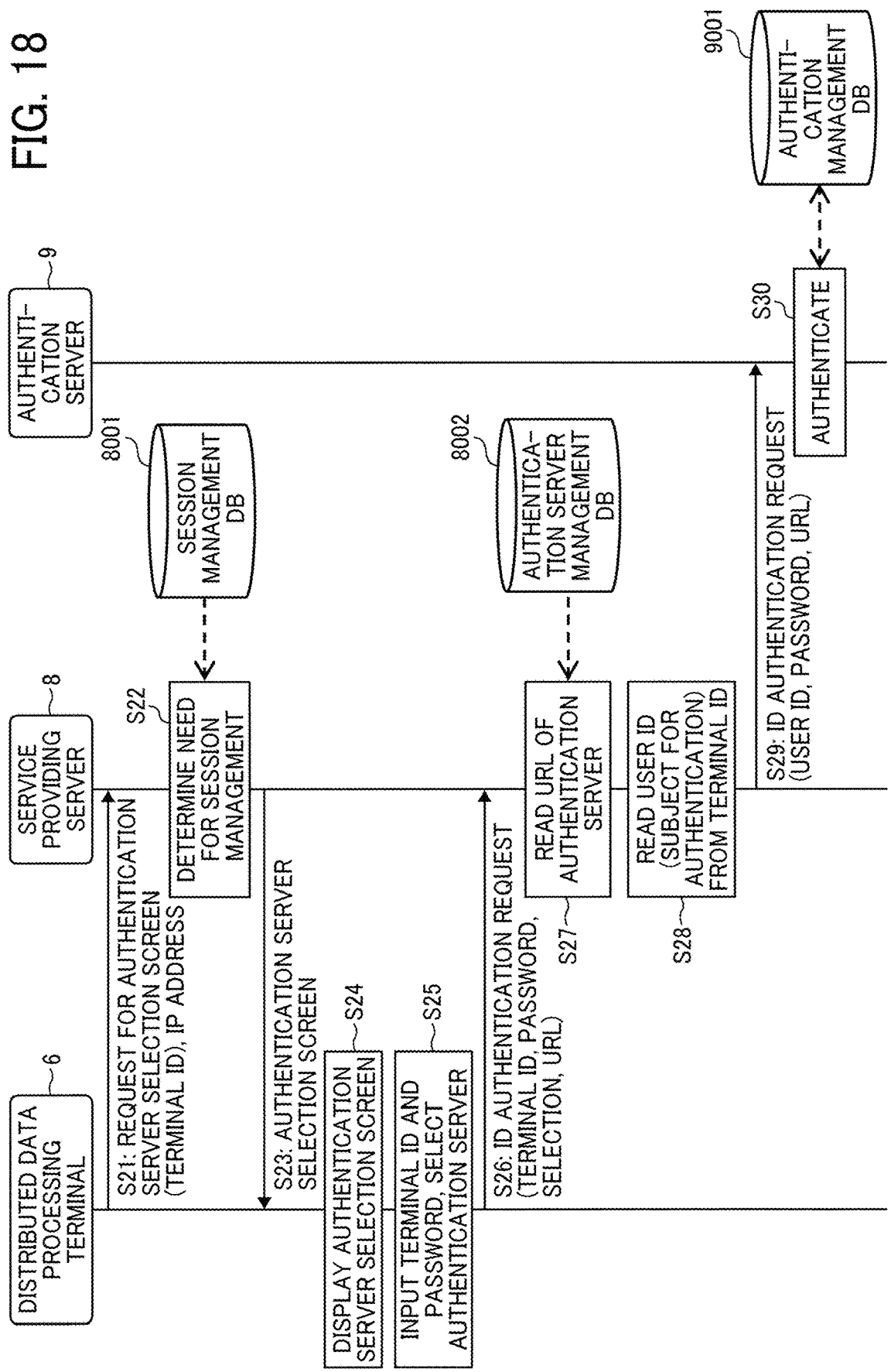
FIG. 18 is a sequence diagram illustrating authentication processing, performed by the communication system of FIG. 1, according to an embodiment.
Figure 19:
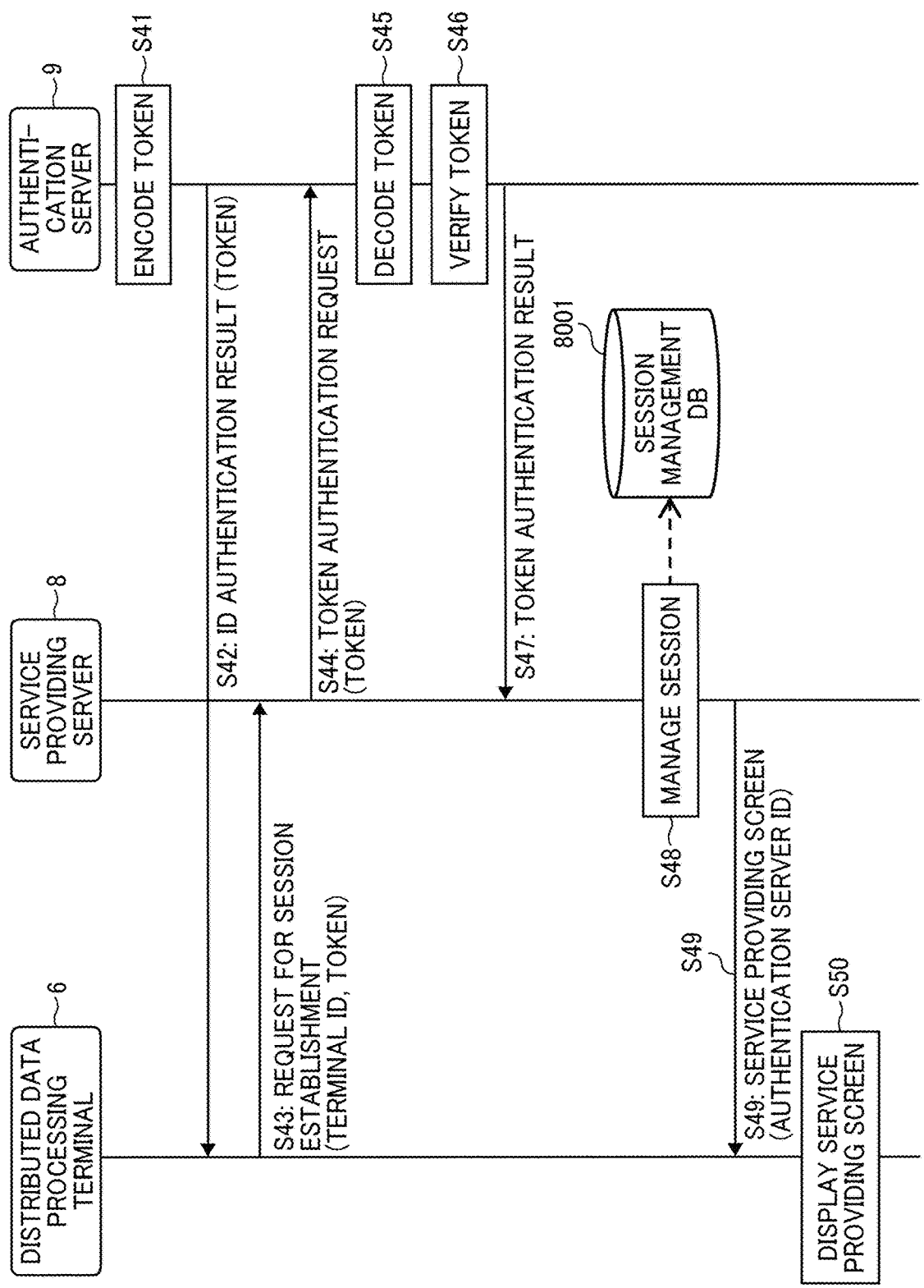
FIG. 19 is a sequence diagram illustrating authentication processing, performed by the communication system of FIG. 1 after processing of FIG. 18, according to the embodiment.
Figure 20:
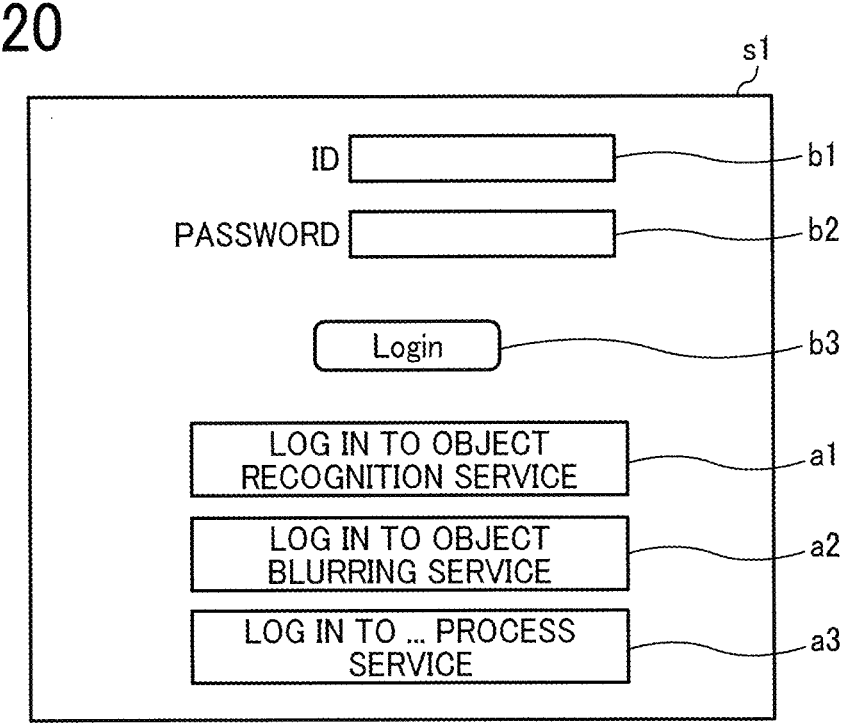
FIG. 20 is an example authentication server selection screen to be displayed at the distributed data processing terminal.
Figure 21:
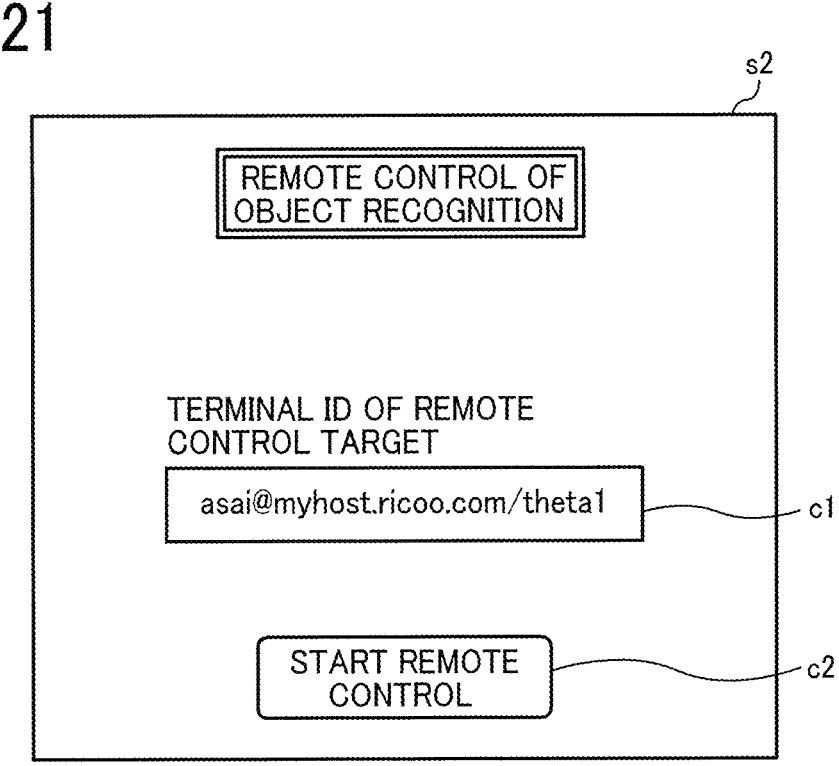
FIG. 21 is an example service providing screen to be displayed at the distributed data processing terminal.

First, authentication processing will be described with reference to FIGS. 18 to 21. FIGS. 18 and 19 are sequence diagrams illustrating authentication processing, performed by the communication system 1, according to the embodiment. FIG. 20 and FIG. 21 are diagrams illustrating examples of screens, displayed at the distributed data processing terminal 6.

As illustrated in FIG. 18, the transmitter and receiver 61 of the distributed data processing terminal 6 transmits a request for an authentication server selection screen to the service providing server 8 (S21). This authentication server selection screen request includes the terminal ID of the distributed data processing terminal 6. The transmitter and receiver 61 further transmits the IP address of the distributed data processing terminal 6, with the authentication server selection screen request. The transmitter and receiver 81 of the service providing server 8 receives the request for the authentication server selection screen and the IP address of the distributed data processing terminal 6.

Next, the determiner 82 of the service providing server 8 determines whether or not the terminal ID of the distributed data processing terminal 6 received at S21 is stored in association with a session ID in the session management table (FIG. 14) (S22). Hereinafter, the case where the terminal ID of the distributed data processing terminal 6 is not stored in association with the session ID will be described.

The transmitter and receiver 81 of the service providing server 8 transmits data of an authentication server selection screen to the distributed data processing terminal 6 (S23).

The transmitter and receiver 61 of the distributed data processing terminal 6 receives the data of the authentication server selection screen.

Next, the display control 67 of the distributed data processing terminal 6 controls the display 517 to display an authentication server selection screen s1 as illustrated in FIG. 20 (S24). FIG. 20 illustrates an example of the authentication server selection screen s1, displayed at the distributed data processing terminal 6. The authentication server selection screen s1 includes an ID entry field b1, a password entry field b2, and a login button b3 for accepting a login request (authentication request). The authentication server selection screen s1 further includes a plurality of authentication server selection buttons a1, a2, and a3 for selecting the authentication servers 9a, 9b, and 9c, respectively. For example, the authentication server selection button a1 provides, when selected, a user with a service of object recognition using the object recognition program. The authentication server selection button a2 provides, when selected, a user with a service of object blurring using the object blurring program.

Here, the user inputs the terminal ID of the distributed data processing terminal 6 operated by the user in the ID entry field b1, and a password in the password entry field b2, as information to be used for authentication. As described above referring to FIGS. 14A to 14C, in this example, the email address of the user is used as the terminal ID. After entering the terminal ID and the password, the user presses a desired button from among the authentication server selection buttons a1, a2, and a3, and further presses the login button b3. The acceptance unit 62 accepts a selection of a specific service, indicated by the selected authentication server selection button (S25). For example, in response to selection of the authentication server selection button a1, the service providing server 8 provides the object recognition service according to the object recognition program ProgD01. In response to selection of the authentication server selection button a2, the service providing server 8 provides the object blurring service according to the object blurring program ProgD02.

The transmitter and receiver 61 transmits an ID authentication request for authenticating the ID (in this example, the terminal ID) of the distributed data processing terminal 6 to the service providing server 8 (S26). The ID authentication request includes the terminal ID and the password, and the selection result of the authentication server 9, received at S25, and the URL of the distributed data processing terminal 6. The selection result of the authentication server 9 indicates an authentication server ID for identifying the selected authentication server 9. The transmitter and receiver 81 of the service providing server 8 receives the ID authentication request.

Next, the storing and reading unit 89 of the service providing server 8 searches the authentication server management table (FIG. 16) using the authentication server ID, which is received at S26 as the selection result, as a search key, to read out the URL of the authentication server associated with the received authentication server ID (S27).

The extractor 87 extracts only the user ID (the part subject for authentication) out of the terminal ID received at S26 (S28). Then, the transmitter and receiver 81 transmits an ID authentication request to the authentication server 9 indicated by the URL read out at S27 (S29). The ID authentication request includes the user ID (the part subject for authentication) extracted at S28, the password received at S26, and the URL of the distributed data processing terminal 6 received at S26. Accordingly, the transmitter and receiver 71 of the authentication server 9 receives the ID authentication request, which is a request for authenticating the user of the distributed data processing terminal 6.

Next, the storing and reading unit 99 of the authentication server 9 searches the authentication management table (FIG. 17), using a pair of the user ID (the part subject for authentication) and the password received at S29 as a search key, to output a search result. Based on this search result indicating whether the same pair has been stored, the authentication unit 92 authenticates the ID of the distributed data processing terminal 6 (S30). When the same pair is stored, the authentication unit 92 determines that the distributed data processing terminal 6 is an authorized terminal allowed to receive a requested service from the service providing server 8. When the same pair is not stored, the authentication unit 92 determines that the distributed data processing terminal 6 is not an authorized terminal for receiving a requested service from the service providing server 8.

At S28, the extractor 87 extracts the part subject for authentication from the terminal ID, but it is not limited thereto. For example, the service providing server 8 does not have to be provided with the extractor 87. In such case, at S29, the transmitter and receiver 81 may transmit only the user ID (the part subjected for authentication) out of the terminal ID, in addition to the password and the URL. While a part of the user ID may not be recognized without the extractor 87, as long as the user ID is recognized and sent to the authentication server 9, the authentication server 9 is able to authenticate the user at the distributed data processing terminal 6. For example, the authentication server 9 may be provided with the extractor 87 to extract the part subjected for authentication, from the user ID that is received. More specifically, in one example, the distributed data processing terminal 6 may extract the part subjected to authentication from the terminal ID in prior to S26. In such case, at S26, the user ID (the part subjected to authentication) is sent. Alternatively, the authentication server 9 may extract, from the terminal ID, the part subjected to authentication after S29. In such case, the terminal ID is transmitted at S29, rather than the user ID (the part subjected to authentication).

Subsequently, as illustrated in FIG. 19, the authentication unit 92 of the authentication server 9 encodes a token (transmission right) (S41). The transmitter and receiver 91 of the authentication server 9 transmits an ID authentication result to the distributed data processing terminal 6, using the URL of the distributed data processing terminal 6 received at S29 (S42). The ID authentication result indicates whether or not the distributed data processing terminal 6 is an authorized terminal, and further includes the token encoded at S41 when the distributed data processing terminal 6 is an authorized terminal. When the distributed data processing terminal 6 is not an authorized terminal, the ID authentication result includes an error message. Accordingly, the transmitter and receiver 61 of the distributed data processing terminal 6 receives the ID authentication result indicating whether the distributed data processing terminal 6 is an authorized terminal, that is, whether the user is authorized to use the requested service. The following describes an example case in which the user is determined to be the authorized user.

The transmitter and receiver 61 of the distributed data processing terminal 6 transmits a request for establishing a session to the service providing server 8 (S43). This session establishment request includes the terminal ID, which is authenticated, and the encoded token received at S42. Accordingly, the transmitter and receiver 81 of the service providing server 8 receives the session establishment request.

Next, to confirm that the distributed data processing terminal 6 that transmitted the session establishment request has been determined to be a terminal operated by the authorized user at S30, the service providing server 8 transmits a token authentication request to the authentication server 9 (S44). The token authentication request includes the encoded token received at S43. Accordingly, the transmitter and receiver 91 of the authentication server 9 receives the token authentication request.

Next, the authentication unit 92 decodes the encoded token received at S44 (S45). The authentication unit 92 authenticates the token by comparing the token before encoding at S41 with the token after decoding at S45 (S46). Then, the transmitter and receiver 91 of the authentication server 9 transmits the token authentication result of S46 to the service providing server 8 (S47). Accordingly, the transmitter and receiver 81 of the service providing server 8 receives the token authentication result. The following illustrates the example case in which the token is authenticated at S46.

Next, the storing and reading unit 89 of the service providing server 8 newly assigns a session ID to a session being established with the distributed data processing terminal 6, and stores in the session management table (FIG. 14) the terminal ID and the IP address of the distributed data processing terminal 6, received at S21, in association with the newly-assigned session ID (S48). The transmitter and receiver 81 transmits data of a service providing screen to the distributed data processing terminal 6 through the established session (S49). The transmitter and receiver 81 further transmits an authentication server ID of the authentication server 9, and the session ID generated at S48. Accordingly, the transmitter and receiver 61 of the distributed data processing terminal 6 receives the data of the service providing screen, the authentication server ID, and the session ID.

Next, the display control 67 of the distributed data processing terminal 6 controls the display 517 to display the service providing screen s2 as illustrated in FIG. 21 (S50). FIG. 21 illustrates an example of the service providing screen s2 displayed at the distributed data processing terminal 6. The service providing screen s2 requests the user to enter a detection target. As described above, in this example, it is assumed that more than one image acquisition terminal 2 is provided under management of the distributed data processing terminal 6. The user at the distributed data processing terminal 6 selects at least one image acquisition terminal 2, as a detection target.

The following describes an example case in which a remote operation service is provided as an example service, which remotely controls the image acquisition terminal 2 from the distributed data processing terminal 6. The service providing screen s2 illustrated in FIG. 20 includes an entry field c1 for an IP address for identifying a remote-control target, and a "remote control start" button c2. In this example, a terminal ID of the image acquisition terminal 2 is input to identify the image acquisition terminal 2 as a remote control target. Alternatively, an IP address for identifying an address of the image acquisition terminal 2, or a connection address other than the IP address, may be input as an address for identifying the remote control target.

As described above, more than one image acquisition terminal 2 may be managed by the distributed data processing terminal 6. In such case, the user at the distributed data processing terminal 6 enters information identifying one or more of the image acquisition terminals 2, as a remote control target.

Referring now to FIGS. 22 to 26, operation of executing processing to provide a service is described according to a first embodiment.

<Preparation for Image Recognition>
(Execution of Service)

Figure 22:
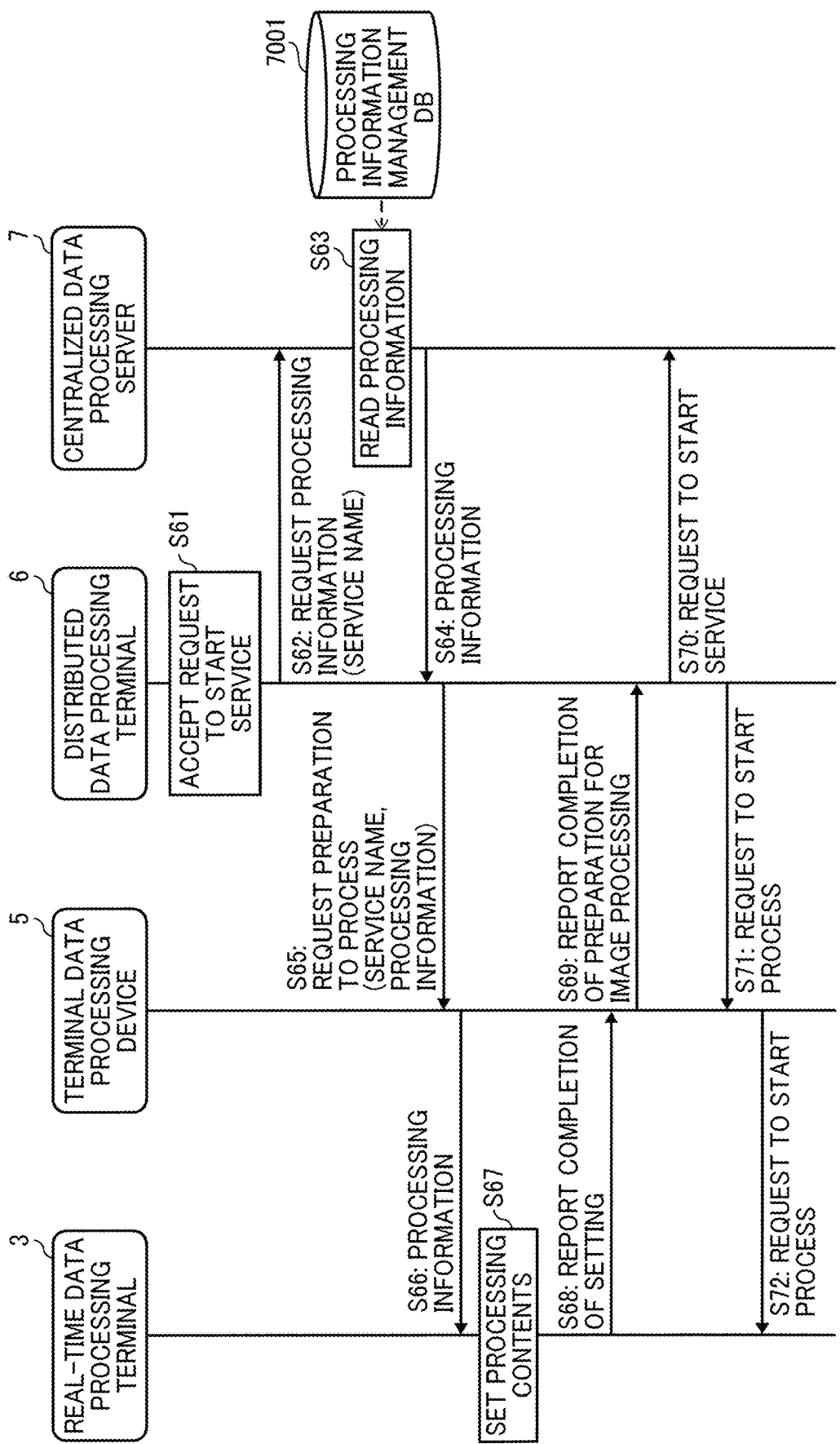
FIG. 22 is a sequence diagram illustrating operation of processing a request for starting a specific service, performed by the communication system 1, according to an embodiment.

Referring to FIG. 22, operation of processing a request for starting a specific service, is described according to an embodiment.

At the distributed data processing terminal 6, the acceptance unit 62 accepts a request to start a service identified with a service name that is selected by the user (S61). In this example, the distributed data processing terminal 6 displays a screen to the user using a GUI (Graphical User Interface), which allows the user to input a selection of a specific service to be provided. In other words, the distributed data processing terminal 6 provides a user interface for the real-time data processing terminal 3. While a service may be identified with a service name selected by the user, a service may be identified with any other identification information such as an authentication server ID as described above referring to FIG. 20. In such case, the distributed data processing terminal 6 may obtain a service name using the authentication server ID. The transmitter and receiver 61 of the distributed data processing terminal 6 transmits a request for obtaining processing information to the centralized data processing server 7 (S62). At this time, a service name for identifying a service to be started (object recognition, face blurring, etc.) is transmitted. The transmitter and receiver 71 of the centralized data processing server 7 receives the request for processing information.

The storing and reading unit 79 of the centralized data processing server 7 searches the processing information management DB 7001 using the service name received at S62 as a search key to read the corresponding processing information (S63). For example, when the object (face) recognition service is selected, the storing and reading unit 70 refers to the table of FIG. 12A. When the object blurring service is selected, the storing and reading unit 70 refers to the table of FIG. 12B or 12C. The storing and reading unit 70 reads from the table of 12B or 12C that is previously stored. As described above, either the table of FIG. 12B or 12C is stored based on processing capability of the centralized data processing server 7. FIG. 12B is stored when the centralized data processing server 7 has relatively high processing capability, such that blurring processing is executed not by the real-time data processing terminal 3 but by the centralized data processing server 7. On the other hand, FIG. 12C is stored when the centralized data processing server 7 has relatively low processing capability, such that the real-time data processing terminal 3 executes the blurring processing.

Next, the transmitter and receiver 71 of the centralized data processing server 7 transmits the processing information, which is obtained, to the transmitter and receiver 61 of the distributed data processing terminal 6 (S64). The transmitter and receiver 61 of the distributed data processing terminal 6 receives the processing information.

The transmitter and receiver 61 of the distributed data processing terminal 6 transmits a request for preparing processing to the terminal data processing device 5 of the image acquisition terminal 2 (S65). The transmitter and receiver 21 of the image acquisition terminal 2 receives the request for preparation processing. The request for preparation processing includes the name of the service obtained at S61, and the processing information received at S64. The communication unit 58 of the terminal data processing device 5 transmits the processing information to the communication unit 48 of the real-time data processing terminal 3 (S66). The storing and reading unit 39 of the real-time data processing terminal 3 configures various settings related to processing to be executed, based on the processing information that is received (S67). Details of the setting of processing to be executed will be described below for each service that is requested.

After setting at S67, the communication unit 48 of the real-time data processing terminal 3 transmits a notification indicating completion of setting, to the terminal data processing device 5 (S68). The transmitter and receiver 51 of the terminal data processing device 5 receives the notification indicating completion of setting. The transmitter and receiver 51 of the terminal data processing device 5 transmits a notification indicating completion of preparation processing to the distributed data processing terminal 6 (S69). The transmitter and receiver 61 of the distributed data processing terminal 6 receives the notification indicating completion of preparation processing.

The transmitter and receiver 61 of the distributed data processing terminal 6 transmits a request for starting the service to the centralized data processing server 7 (S70). The transmitter and receiver 71 of the centralized data processing server 7 receives the request for starting the service. The transmitter and receiver 61 of the distributed data processing terminal 6 transmits a request for starting processing to the terminal data processing device 5 (S71). The communication unit 58 of the terminal data processing device 5 transmits the request for starting processing to the communication unit 48 of the real-time data processing terminal 3 (S72). Accordingly, processing is started to provide the service requested by the user. Details of processing to provide the service will be described below for each service that may be requested in this example.

Specifically, the following describes three scenarios including: a first scenario in which processing to provide the object (face) recognition service is executed; a second scenario in which processing to provide the object blurring service is executed while blurring processing is performed at the centralized data processing server 7; and a third scenario in which processing to provide the object blurring service is executed while blurring processing is performed at the real-time data processing terminal 3.

(Setting Processing of Real-Time Data Processing Terminal)

The operation of setting performed at the image acquisition terminal 2, at S67 of FIG. 22, will be described for each scenario.

[a] First Scenario: Object Recognition Service

In response to reception of the processing information (S65), the data detector 56 of the terminal data processing device 5 identifies a service (in this case, object recognition service) to be executed based on the service name (object recognition) that is received. The communication unit 58 of the terminal data processing device 5 instructs the communication unit 48 of the real-time data processing terminal 3 to set various settings described in the following, according to the processing information, which indicates information obtained from the processing information management table of FIG. 12A. The object detector 35 performs preparation processing (such as activation of program) to be ready for objection detection. The image processing unit 34 sets a number of horizontal pixels of the facial area image (object area image) to 200, and a number of vertical pixels of the facial area image (object area image) to 200. In this example, a size of the object area image is determined so as to be suitable to an object (face) recognition algorithm to be performed at the verification unit 75 of the centralized data processing server 7. The image processing unit 34 sets a projection method of the object area image detected by the object detector 35, to a perspective projection method. In this example, the projection method is determined so as to be suitable for verification processing to be performed at the verification unit 75 of the centralized data processing server 7.

[b] Second Scenario: Object Blurring Service (Blurring Processing Performed at Server)

In response to reception of the processing information (S65), the data detector 56 of the terminal data processing device 5 identifies a service (in this case, object blurring service) to be executed based on the service name (object blurring) that is received. The communication unit 58 of the terminal data processing device 5 instructs the communication unit 48 of the real-time data processing terminal 3 to set various settings described in the following, according to the processing information, which indicates information obtained from the processing information management table of FIG. 12B. The blurring processor 47 sets the object blurring process to be invalid (OFF). The image processing unit 34 instructs the imaging unit 40 via the connection unit 38 to set a number of horizontal pixels of the captured image to 3840, and a number of vertical pixels of the captured image to 2160. In this case, the imaging unit 40 sets the maximum image size that can be captured, however, the image size may be made smaller than the maximum image size. The image processing unit 34 sets a projection method applied to the captured image obtained from the imaging unit 40 to an equirectangular projection. The transformation of the projection method may be performed by the centralized data processing server 7.

[c] Third Scenario: Object Blurring Service (Blurring Processing Performed at Terminal)

In response to reception of the processing information (S65), the data detector 56 of the terminal data processing device 5 identifies a service (in this case, object blurring service) to be executed based on the service name (object blurring) that is received. The communication unit 58 of the terminal data processing device 5 instructs the communication unit 48 of the real-time data processing terminal 3 to set various settings described in the following, according to the processing information, which indicates information obtained from the processing information management table of FIG. 12C. The blurring processor 47 sets the object blurring process to be valid (ON). The image processing unit 34 instructs the imaging unit 40 via the connection unit 38 to set a number of horizontal pixels of the captured image to 3840, and a number of vertical pixels of the captured image to 2160. In this case, the imaging unit 40 sets the maximum image size that can be captured, however, the image size may be made smaller than the maximum image size. The image processing unit 34 sets a projection method applied to the captured image obtained from the imaging unit 40 to an equirectangular projection. The transformation of the projection method may be performed by the centralized data processing server 7.

<Processing by Real-Data Processing Terminal when Service is being Executed>

Referring to FIGS. 23 to 26, operation of executing the service is described for each of the above-described scenarios.

[a] First Scenario: Object Recognition Service

Figure 23:
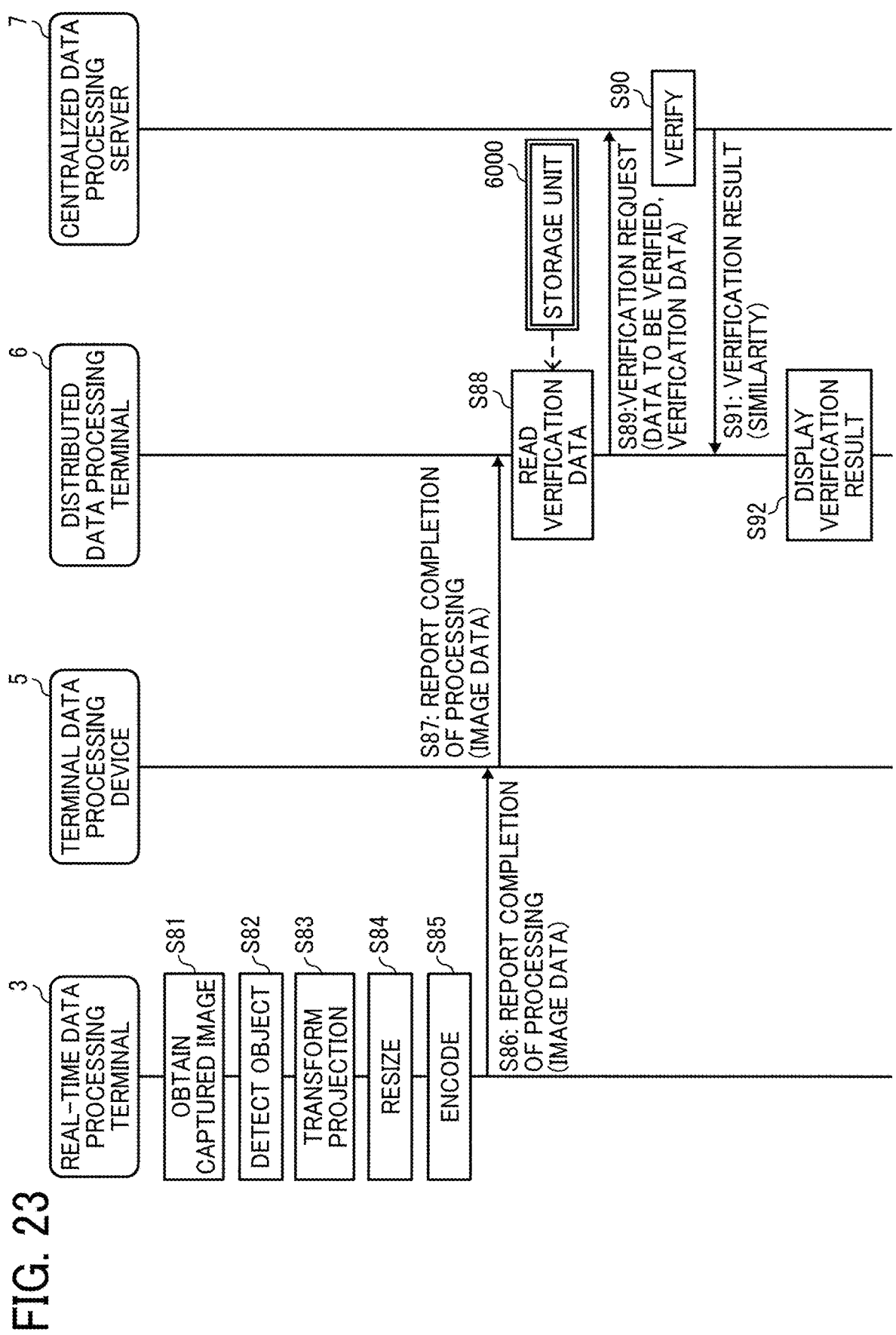
FIG. 23 is a sequence diagram illustrating operation of executing processing to provide an object recognition service, referring to the table of FIG. 12A, according to an embodiment.

FIG. 23 is a sequence diagram illustrating operation of processing an object recognition service, when the real-time data processing terminal 3 is set with information in the processing information management table of FIG. 12A, according to an embodiment.

As the imaging unit 40 captures an image, the connection unit 38 of the real-time data processing terminal 3 obtains the captured image from the imaging unit 40 (S81).

Next, the object detector 35 of the real-time data processing terminal 3 detects an object (in this case, a face) in the captured image (S82). When a target object (in this case, a face) is detected at S82, the image processing unit 34 performs projection transformation on a partial area of the captured image (S83). In this case, the image processing unit 34 transforms a projection of the captured image, from the equidistance projection to a perspective projection, according to settings that has been set according to the processing information. More specifically, projection transformation is applied to an object area image including the detected object, such as a facial area image including the detected face.

The image processing unit 34 re-sizes the object area image, which is a partial image including the detected object (face), to match size defined by the number of horizontal pixels and the number of vertical pixels that are set according to the processing information, to generate partial image data to be verified (S84). The number of horizontal pixels and the number of vertical pixels used in resizing are each determined, such that the centralized data processing server 7 can easily compare with verification data.

The image processing unit 34 encodes the partial image data, which is an object area image including the object (face) (S85). The communication unit 48 of the real-time data processing terminal 3 transmits a notification indicating completion of image processing, to the communication unit 58 of the terminal data processing device 5 (S86) This notification for completion of image processing includes data to be verified, which is partial image data that has been encoded at S85. The transmitter and receiver 51 of the terminal data processing device 5 receives the notification indicating completion of image processing.

The transmitter and receiver 51 of the terminal data processing device 5 transmits a notification indicating completion of image processing to the distributed data processing terminal 6 (S87). This notification for completion of image processing includes the data to be verified, which is received at S86. The transmitter and receiver 61 of the distributed data processing terminal 6 receives the notification indicating completion of image processing.

The storing and reading unit 69 of the distributed data processing terminal 6 reads out the verification data from the storage unit 6000 (S88). The transmitter and receiver 61 of the distributed data processing terminal 6 transmits a request for verification to the centralized data processing server 7 (S89). The verification request includes the data to be verified received at S87 and the verification data read at S88. The centralized data processing server 7 receives the verification request at the transmitter and receiver 71.

Next, the verification unit 75 of the centralized data processing server 7 verifies the data to be verified, using the verification data received at S89, and calculates a score indicating the degree of similarity between these data (S90). After the calculation of the degree of similarity by the verification unit 75, the transmitter and receiver 71 transmits a verification result to the distributed data processing terminal 6 (S91). The verification result includes the degree of similarity calculated at S90. The transmitter and receiver 61 of the distributed data processing terminal 6 receives the verification result.

The display control 67 of the distributed data processing terminal 6 causes the display 517 to display a verification result screen, based on the verification result (similarity) received at S91 (S92).

[b] Second Scenario: Object Blurring Service (Blurring Processing Performed at Server)

Figure 24:
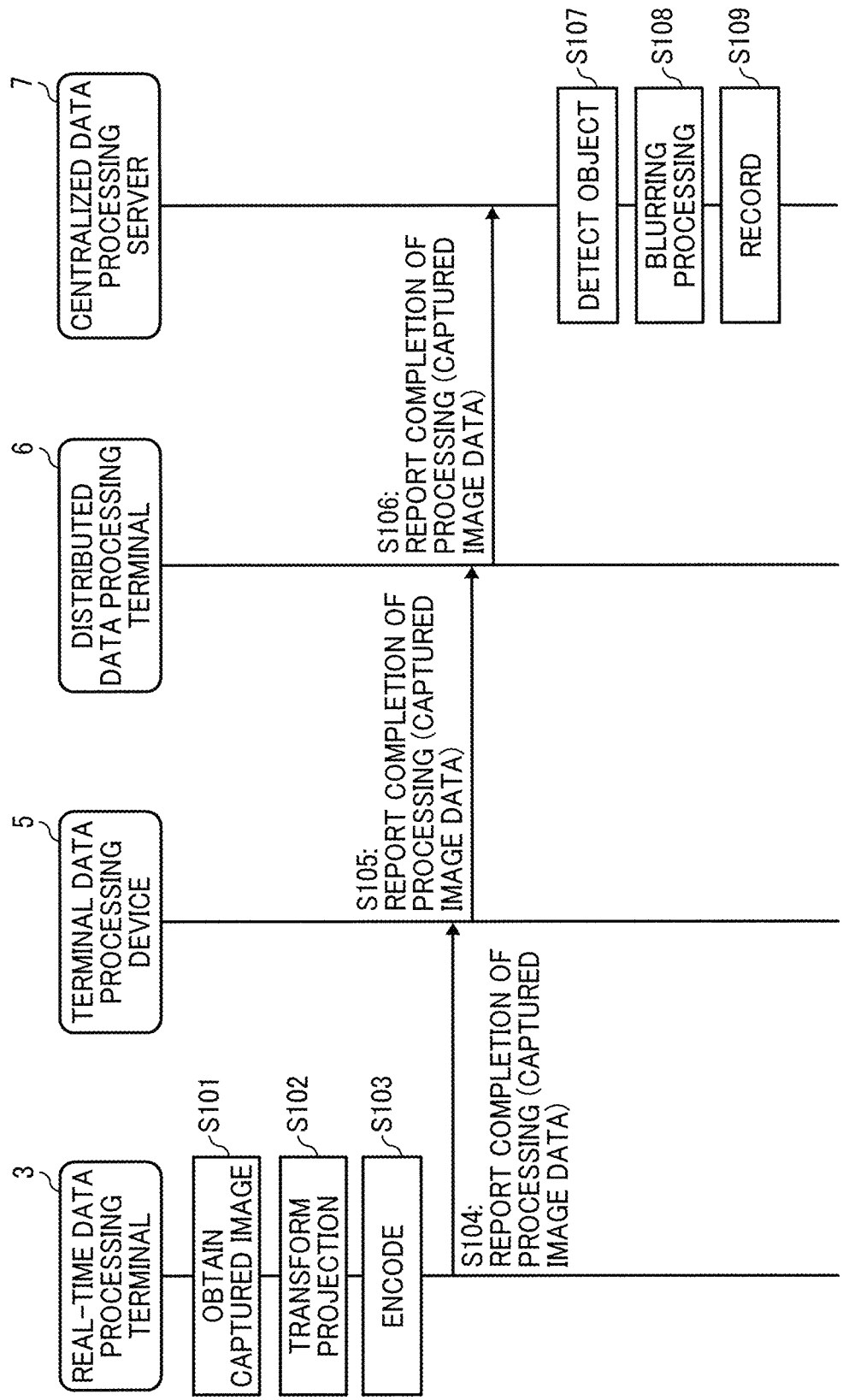
FIG. 24 is a sequence diagram illustrating operation of executing processing to provide an object blurring service, referring to the table of FIG. 12B, according to an embodiment.
Figures 26, 27A, 27B:
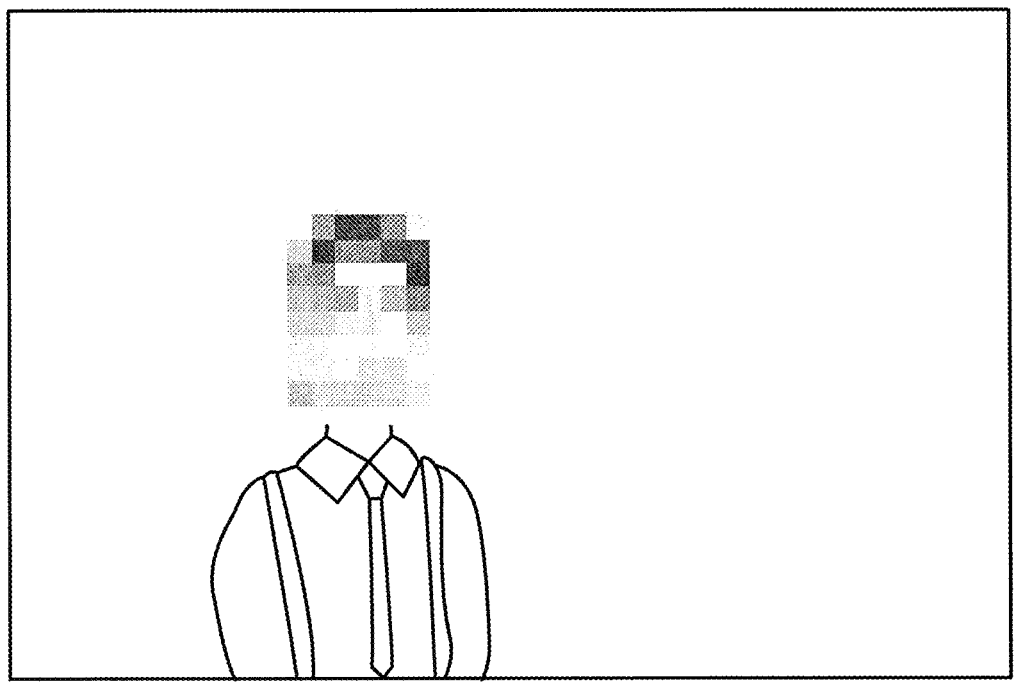
FIG. 26 is an illustration of an example captured image, displayed at the distributed data processing terminal.
FIGS. 27A and 27B are each a conceptual diagram illustrating an example of processing information management table.

FIG. 24 is a sequence diagram illustrating operation of processing an object blurring service, when the real-time data processing terminal 3 is set with information in the processing information management table of FIG. 12B, according to an embodiment. FIG. 26 is an illustration of an example image with blurring processing, displayed at the distributed data processing terminal 6.

As the imaging unit 40 captures an image, the connection unit 38 of the real-time data processing terminal 3 obtains the captured image from the imaging unit 40 (S101). In capturing the image, an interval shooting function of the imaging unit 40 is used.

The image processing unit 34 of the real-time data processing terminal 3 performs projection transformation on the captured image (S102) In this case, the image processing unit 34 transforms a projection of the captured image, from the equidistance projection to the equirectangular projection, according to settings based on the processing information.

The image processing unit 34 encodes (encodes) the captured image, which has not been applied with the blurring processing (S103).

The communication unit 48 of the real-time data processing terminal 3 transmits a notification indicating completion of image processing, to the communication unit 58 of the terminal data processing device 5 (S104). This notification for completion of image processing includes the captured image data that has been encoded at S103. The communication unit 58 of the terminal data processing device 5 receives the notification indicating completion of image processing.

The transmitter and receiver 51 of the terminal data processing device 5 transmits a notification indicating completion of image processing to the distributed data processing terminal 6 (S105). This notification for completion of image processing includes the captured image data, which is received at S104. The transmitter and receiver 61 of the distributed data processing terminal 6 receives the notification indicating completion of image processing.

The transmitter and receiver 61 of the distributed data processing terminal 6 transmits a notification indicating completion of image processing to the centralized data processing server 7 (S106) This notification for completion of image processing includes the captured image data, which is received at S105. The transmitter and receiver 71 of the centralized data processing server 7 receives the notification for completion of image processing.

The object detector 76 of the centralized data processing server 7 detects an object (face) in the captured image data (S107). When an object (face) is detected, the blurring processor 77 of the centralized data processing server 7 performs blurring processing on partial image data, which is an object area image including the detected object (face) (S108). The storing and reading unit 79 of the centralized data processing server 7 stores the partial image data to which the blurring processing is applied, in the storage unit 7000 (S109).

In this example, the storing and reading unit 79 may store captured image data including the partial image data to which the blurring processing is applied. As illustrated in FIG. 26, such captured image data includes an object area image (facial area image) to which blurring processing is applied, and an area other than the object area image (that is, other part of the user's body and a background) applied with no blurring processing.

[c] Third Scenario: Object Blurring Service (Blurring Processing Performed at Terminal)

Figure 25:
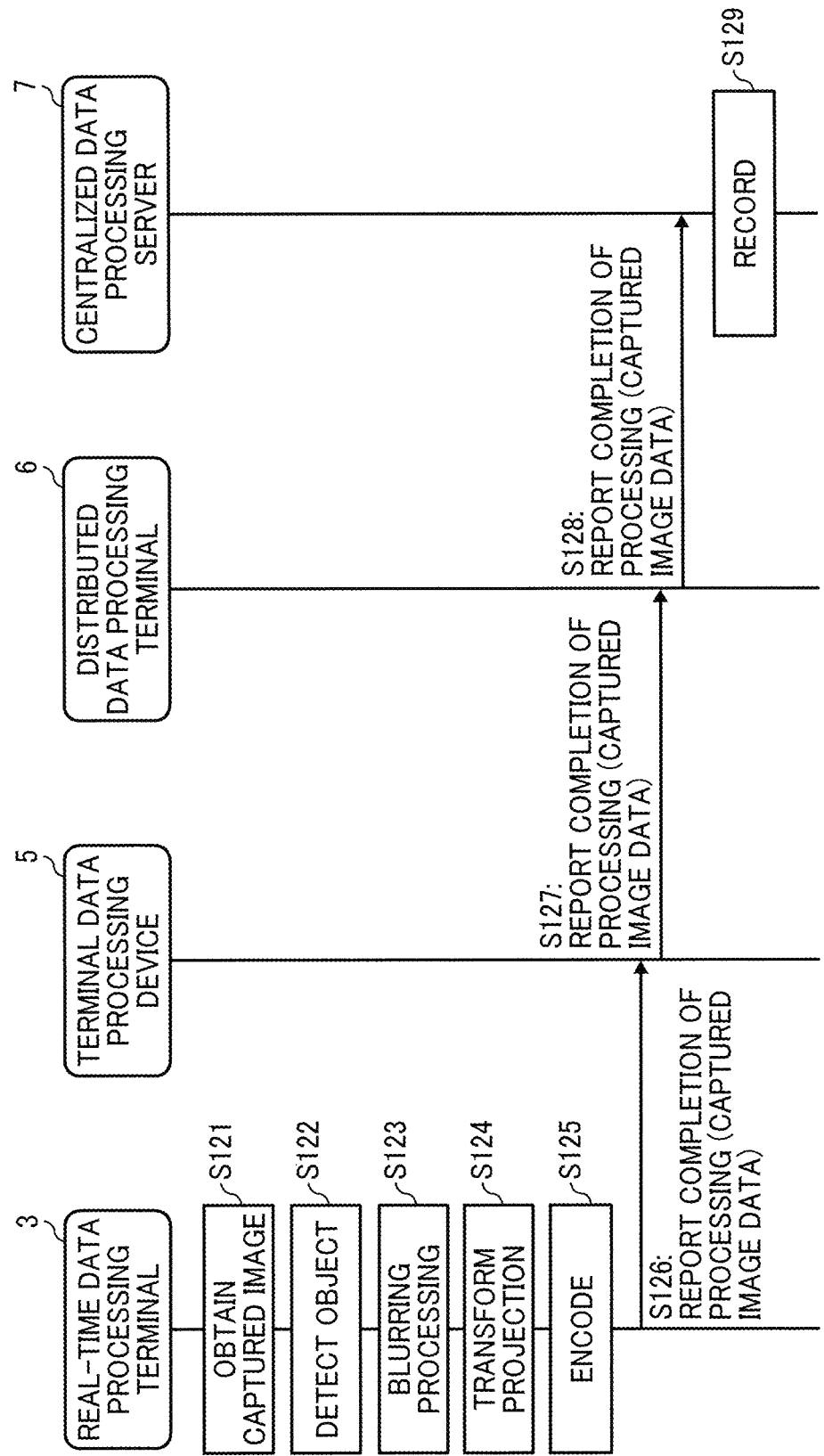
FIG. 25 is a sequence diagram illustrating operation of executing processing to provide an object blurring service, referring to the table of FIG. 12C, according to an embodiment.

FIG. 25 is a sequence diagram illustrating operation of processing an object blurring service, when the real-time data processing terminal 3 is set with information in the processing information management table of FIG. 12C, according to an embodiment.

As the imaging unit 40 captures an image, the connection unit 38 of the real-time data processing terminal 3 obtains the captured image from the imaging unit 40 (S121). In capturing the image, an interval shooting function of the imaging unit 40 is used.

Next, the object detector 35 of the real-time data processing terminal 3 detects an object (in this case, a face) in the captured image (122). When an object (face) is detected, the blurring processor 47 of the real-time data processing terminal 3 performs blurring processing on partial image data, which is an object area image including the detected object (face) (S123).

The image processing unit 34 of the real-time data processing terminal 3 performs projection transformation on the captured image data including the object area image to which blurring processing is applied (S124). In this case, the image processing unit 34 transforms a projection of the captured image data, from the equidistance projection to the equirectangular projection, according to settings based on the processing information.

The image processing unit 34 encodes the captured image data including the partial image data, which is the object area image including the object (face) that has been applied with blurring processing and projection transformation (S125) More specifically, as illustrated in FIG. 26, the captured image data includes an object area image (facial area image) to which blurring processing is applied, and an area other than the object area image (that is, other part of the user's body and a background) applied with no blurring processing.

The communication unit 48 of the real-time data processing terminal 3 transmits a notification indicating completion of image processing, to the communication unit 58 of the terminal data processing device 5 (S126). This notification for completion of image processing includes the captured image data that has been applied with blurring processing and encoded at S125. The communication unit 58 of the terminal data processing device 5 receives the notification indicating completion of image processing.

The transmitter and receiver 51 of the terminal data processing device 5 transmits a notification indicating completion of image processing to the distributed data processing terminal 6 (S127). This notification for completion of image processing includes the captured image data applied with blurring processing, which is received at S126. The transmitter and receiver 61 of the distributed data processing terminal 6 receives the notification indicating completion of image processing.

The transmitter and receiver 61 of the distributed data processing terminal 6 transmits a notification indicating completion of image processing to the centralized data processing server 7 (S128) This notification for completion of image processing includes the captured image data applied with blurring processing, which is received at S127.

The transmitter and receiver 71 of the centralized data processing server 7 receives the notification for completion of image processing. The storing and reading unit 79 of the centralized data processing server 7 stores the captured image data to which the blurring processing is applied, in the storage unit 7000 (S109).

As described above, when the centralized data processing server 7 has relatively high processing capability, blurring processing is executed not by the real-time data processing terminal 3 but by the centralized data processing server 7 (See FIG. 24). On the other hand, when the centralized data processing server 7 has relatively low processing capability, blurring processing is executed by the real-time data processing terminal 3 (See FIG. 25).

Moreover, with the processing information management DB 7001 stored in the centralized data processing server 7, processing information used for configuring various settings on the real-time data processing terminal 3 in providing a specific service can be easily managed.

As described above, according to one or more embodiments described above, post-processing (face recognition, face blurring, etc.) to be performed on the captured image data, or various settings for such post-processing, can be easily changed or managed. For example, even if there is a difference in processing capability between various servers, sharing of processing can be determined flexibly, for example, between the image acquisition terminal 2 and the centralized data processing server 7.

For example, an image capturing device, such as the imaging unit 40, used with the image acquisition terminal 2 is not usually designed to be flexible in terms of image processing to be applied to the captured image data. With the use of processing information, the user (in this case, the system administrator, for example) can easily change a specific processing to be performed on the captured image data, which is to be performed to provide a specific service.

In one example, the image acquisition terminal 2 may be configured to perform processing, such as post-processing, on the captured image data obtained by the imaging unit 40. Accordingly, it is not always necessary to cause the server, such as the centralized data processing server 7, to perform additional processing. More specifically, as described above, in response to a request for an object recognition service (see FIG. 11D and FIG. 23), the real-time data processing terminal 3 of the image acquisition terminal 2 detects an object (S81), transforms a projection of the image (S82), and resizes the image (S83), to process image data to be verified. The centralized data processing server 7 performs verification processing on the image data that has been processed (S89). That is, even if the centralized data processing server 7 having a relatively low processing capability is used, the real-time data processing terminal 3 can perform processing on the captured image, such as projection transformation and resizing, which may improve image quality, so as to provide an object recognition service that is more desirable.

In another example, various settings such as settings of parameters can be easily changed based on specification of a particular device to perform the processing. For example, depending on processing capability of each device (both on edge or cloud), the user can flexibly modify which device is to perform which processing.

For example, in response to a request for an object blurring service (see FIG. 11D, FIG. 24), the centralized data processing server 7 detects an object in the captured image (S107), and performs blurring processing on the object area image including the detected object (S108). The image acquisition terminal 2 transmits the captured image data without blurring processing (S105). That is, when the image acquisition terminal 2 has a relatively low processing capability, the image acquisition terminal 2 may be set with processing information such that image processing, such as blurring processing, is performed at the centralized data processing server 7.

In another example, in response to a request for an object blurring service (see FIG. 11D, FIG. 25), the real-time data processing terminal 3 of the image acquisition terminal 2 detects an object in the captured image (S122), and performs blurring processing (S123). The centralized data processing server 7 stores the image data after the blurring processing is applied (S129). That is, when the centralized data processing server 7 has a relatively low processing capability, the image acquisition terminal 2 may be set with processing information such that image processing, such as blurring processing, is performed at the real-time data processing terminal 3.

Further, any post processing may be added to provide a specific service. For example, the real-time data processing terminal 3 of the image acquisition terminal 2 is set with processing information to transform a projection of the captured image data (S83, S102, S124), such that distortion of the captured image data that may be caused when capturing the image with a fisheye lens, is corrected. This prevents the user from feeling strangeness when viewing the image.

Moreover, the image size or the projection method may be modified according to various factors such as specification of the imaging unit 40, algorithm used for verification, etc.

Second Embodiment

Figure 28:
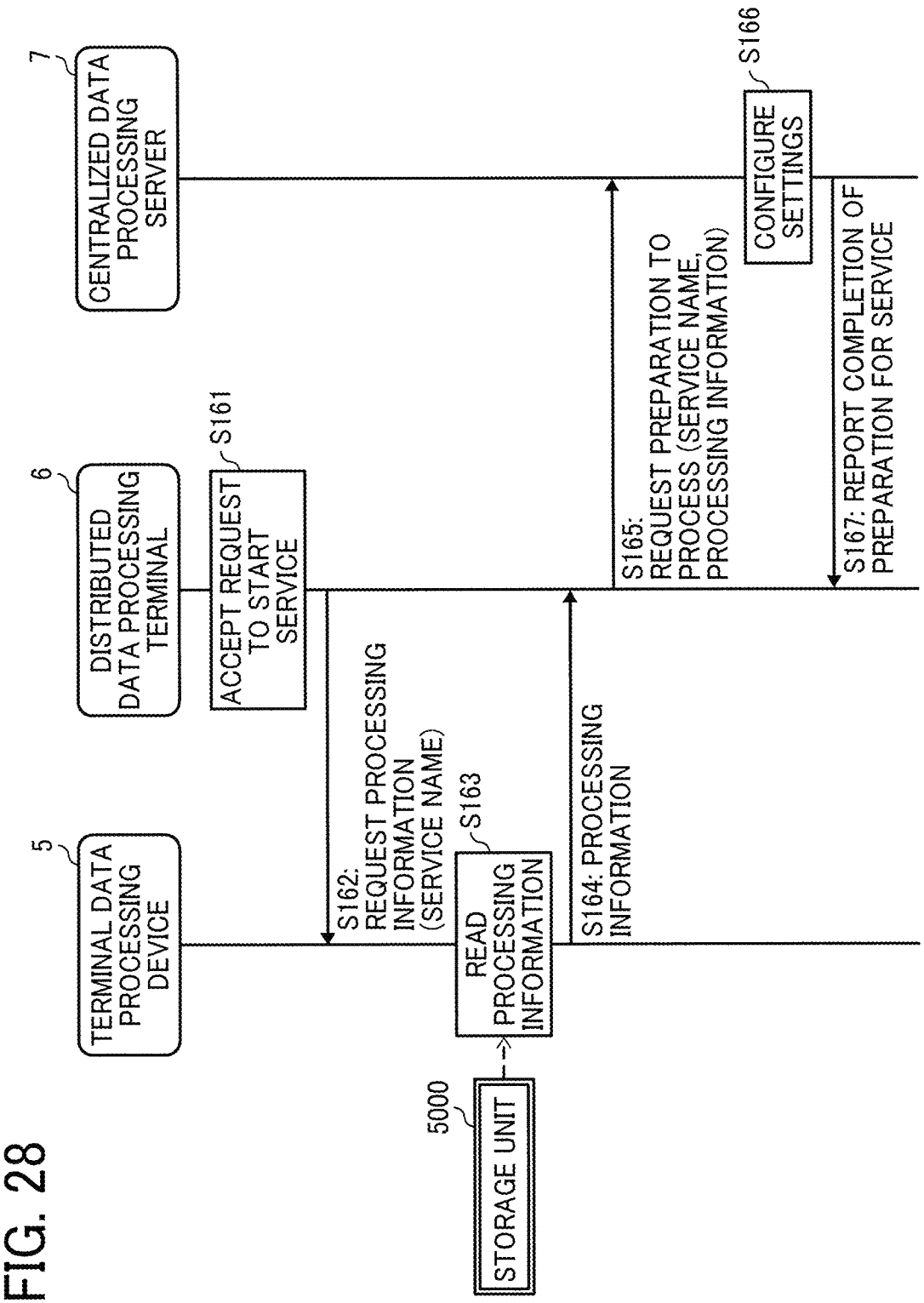
FIG. 28 is a sequence diagram illustrating operation of processing a request for starting a specific service, performed by the communication system 1, according to another embodiment.

Referring to FIGS. 27 to 28, operation of executing processing to provide a service, performed by the communication system 1, is described according to a second embodiment. In the second embodiment, S61 to S69 of FIG. 22 are performed differently. Since the communication system 1 of the second embodiment is substantially the same except for some differences, the following only describes the differences.

In the first embodiment, the processing information management DB 7001 is stored in the storage unit 7000 of the centralized data processing server 7. Alternatively, in the second embodiment, the storage unit 5000 of the terminal data processing device 5 stores the processing information management DB 7001, which is implemented by the tables illustrated in FIGS. 27A and 27B.

(Processing Information Management Table)

The processing information management table illustrated in FIGS. 27A and 27B are each for managing processing to be performed by the centralized data processing server 7 in providing a specific service. In this example, FIGS. 27A and 27B are each provided for the object blurring service. With these tables, a user can set whether object blurring processing is to be executed at the real-time data processing terminal 3 (ON/OFF for "object blurring"). Further, the centralized data processing server 7 is configured to perform processing to store captured image data to which blurring processing is applied (ON for "record image").

If the processing capability of the real-time data processing terminal 3 is relatively high, the storage unit 5000 stores the table of FIG. 27A with the value "ON" for object blurring processing. On the other hand, if the processing capacity of the real-time data processing terminal 3 is relatively low, the storage unit 5000 stores the table of FIG. 27B with the value "OFF" for object blurring processing.

(Execution of Service)

FIG. 28 is a sequence diagram illustrating operation of processing a request for starting a service requested by the user, according to the second embodiment.

At the distributed data processing terminal 6, the acceptance unit 62 accepts a request to start a service identified with a service name that is selected by the user (S161). In this example, the distributed data processing terminal 6 displays a screen to the user using a GUI (Graphical User Interface), which allows the user to input an instruction. This operation is substantially similar to S61 of FIG. 22. For simplicity, it is assumed that the object blurring service is requested.

The transmitter and receiver 61 of the distributed data processing terminal 6 transmits a request for obtaining processing information to the terminal data processing device 5 (S162). At this time, a service name for identifying a service to be started (object recognition, face blurring, etc.) is transmitted. The transmitter and receiver 51 of the terminal data processing device 5 receives the request for processing information.

The storing and reading unit 59 of the terminal data processing device 5 searches the storage unit 5000 using the service name received at S162 as a search key to read the corresponding processing information for the identified service (S163). For simplicity, it is assumed that either the table of FIG. 27A or FIG. 27B is stored in the storage unit 5000.

The transmitter and receiver 51 of the terminal data processing device 5 transmits a response including the processing information that is obtained, to the distributed data processing terminal 6 (S164). Specifically, the processing information that is read at S163 (information obtained from the table FIG. 27A or 27B) is transmitted. The transmitter and receiver 61 of the distributed data processing terminal 6 receives the response including the processing information that is obtained.

The transmitter and receiver 61 of the distributed data processing terminal 6 transmits a request for preparing for the service to the centralized data processing server 7 (S165). In this case, the transmitter and receiver 61 transmits the service name for identifying the service to be started obtained at S161, and the processing information received at S164. The transmitter and receiver 71 of the centralized data processing server 7 receives the request for preparing for the service.

The storing and reading unit 79 of the centralized data processing server 7 configures various settings according to the processing information that is obtained (S166).

Specifically, the storing and reading unit 79 sets a value of object blurring processing to be valid (ON) or invalid (OFF), and a value of image recording to be valid (ON) or invalid (OFF), referring to the processing information.

Specifically, when the real-time data processing terminal 3 has relatively high processing capability, the storage unit 5000 stores the table of FIG. 27A. When the real-time data processing terminal 3 has relatively low processing capability, the storage unit 5000 stores the table of FIG. 27B.

Next, the transmitter and receiver 71 of the centralized data processing server 7 transmits a notification indicating completion of preparation for the service, to the transmitter and receiver 61 of the distributed data processing terminal 6 (S167). The transmitter and receiver 61 of the distributed data processing terminal 6 receives the notification indicating completion of preparation for the service. Since processing after S167 is substantially the same to processing after S69 of FIG. 22, description thereof is omitted.

Further, settings and execution of processes performed by the real-time data processing terminal 3 and the centralized data processing server 7 when the service is being executed, are substantially the same as those of the first embodiment.

For example, when the process information illustrated in the table of FIG. 27A is to be set at S166, the operation illustrated in FIG. 24 is performed. On the other hand, when the process information illustrated in FIG. 27B is to be set at S166, the operation illustrated FIG. 25 is performed.

In the second embodiment, the terminal data processing device 5 stores the processing information management table, which includes processing information for each service. In the second embodiment, load on the centralized data processing server 7 is reduced. Further, with the terminal data processing device 5 that is locally provided for each user site, for example, processing information can be managed more flexibly to meet the processing capability of the real-time data processing terminal 3.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, projection transformation may not only be performed by the real-time data processing terminal 3 of the image acquisition terminal 2, but may be performed by the centralized data processing server 7.

In any one or more of the above-described embodiments, any desired data other than the captured image data that has been captured with the imaging unit 40 may be processed, such as image data created by the user. That is, examples of image data to be processed include the captured image data and the image data created by the user. Alternatively, the image acquisition terminal 2, which is an example of a communication terminal, may generate image data rather than obtaining the image data from the outside. Further, the image acquisition terminal 2 may acquire data other than image data, such as audio data by collecting audio or even temperature data from a temperature sensor, or humidity data from a humidity sensor.

Further, any one of the CPUs 301, 501, and 701, etc. may be a single processor or a multiple processor. Similarly, any one of the image acquisition terminal 2, the distributed data processing terminal 6, and the centralized data processing server 7 may be implemented by one or more apparatus such as one or more computers. The distributed data processing terminal 6 may also operate as a server.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

The illustrated apparatuses are only illustrative of one of several computing environments for implementing the embodiments disclosed herein. For example, in some embodiments, any of the servers in the communication system 1 includes a plurality of computing devices, e.g., a server cluster, that are configured to communicate with each other over any type of communications link, including a network, a shared memory, etc. to collectively perform the processes disclosed herein.

Moreover, the service providing server 8 and the authentication server 9 can be configured to share the processing of authenticating the user in various combinations. That is, the illustrated elements of the service providing server 8 and the authentication server 9 can be combined into a single server apparatus, or divided between a plurality of machines in combinations other than that shown in any of the above-described figures.

The invention claimed is:

1. A communication system, comprising:
   an image acquisition terminal configured to obtain captured image data captured with an imaging unit;
   a data processing server configured to perform processing on the captured image data; and
   a data processing terminal configured to transfer data between the image acquisition terminal and the data processing server, and transmit the captured image data to the data processing server via a network,
   wherein the data processing terminal comprises circuitry configured to:
      in response to a request for performing a specific service, transmit a request for obtaining specific processing information for the specific service to a first device being one of the image acquisition terminal and the data processing server;
      receive a response including the specific processing information from the first device, the specific processing information indicating processing to be executed by at least one of the image acquisition terminal and the data processing server in providing the specific service; and
      transmit the specific processing information to a second device of the image acquisition terminal and the data processing server other than the first device, to cause the second device to configure settings based on the specific processing information and execute processing on the captured image data according to the settings.

2. The communication system of claim 1, wherein:
   the data processing server comprises a memory that stores a set of processing information for one or more services that are provided by a service providing server, the specific service being one of the one or more services,
   the circuitry is further configured to transmit, to the data processing server, the request for obtaining the specific processing information for the specific service, the request including identification information identifying the specific service,
   the data processing server obtains the specific processing information from the memory using the identification information of the specific service, for transmission to the data processing terminal, and
   the circuitry is further configured to transmit the specific processing information received from the data processing server to the image acquisition terminal to cause the image acquisition terminal to configure the settings based on the specific processing information and executing processing on the captured image data according to the settings.

3. The communication system of claim 2, wherein:
   the specific service is an object recognition service,
   the specific processing information for the object recognition service causes the image acquisition terminal to perform object detection, projection transformation, and re-sizing, and
   the circuitry is further configured to transmit the captured image data, to which the object detection, projection transformation, and re-sizing have been applied by the image acquisition terminal, to the data processing server, and
   the data processing server recognizes an object in the captured image data that is received.

4. The communication system of claim 2, wherein:
   the specific service is an object blurring service,
   the specific processing information for the object blurring service causes the image acquisition terminal to perform objection blurring processing,
   the circuitry is further configured to transmit the captured image data, to which the object blurring processing has been applied by the image acquisition terminal, to the data processing server, and
   the data processing server stores the captured image data that is received in the memory.

5. The communication system of claim 4, wherein:
   the specific processing information for the object blurring service further causes the image acquisition terminal to perform projection transformation, and
   the circuitry is further configured to transmit the captured image data, to which the object blurring processing and the projection transformation have been applied by the image acquisition terminal, to the data processing server.

6. The communication system of claim 2, wherein:
   the specific service is an object blurring service,
   the specific processing information for the object blurring service causes the image acquisition terminal not to perform objection blurring processing, and
   the circuitry is further configured to transmit the captured image data, to which the object blurring processing is not applied, to the data processing server, and
   the data processing server applies the object blurring processing to the captured image data, and stores the captured image data applied with the object blurring processing in the memory.

7. The communication system of claim 6, wherein:
   the specific processing information for the object blurring service further causes the image acquisition terminal to perform projection transformation, and
   the circuitry is further configured to transmit the captured image data, to which the projection transformation has been applied by the image acquisition terminal, to the data processing server.

8. The communication system of claim 1, wherein:
   the image acquisition terminal comprises a memory that stores a set of processing information for the specific service, the specific service being an object blurring service,
   the circuitry is further configured to transmit, to the image acquisition terminal, the request for obtaining the specific processing information for the object blurring service,
   the image acquisition terminal obtains the specific processing information from the memory for transmission to the data processing terminal, and
   the circuitry is further configured to transmit the specific processing information received from the image acquisition terminal to the data processing server to cause the data processing server to configure the settings based on the specific processing information and execute processing on the captured image data according to the settings.

9. The communication system of claim 8, wherein:
the specific processing information for the object blurring service causes the data processing server to perform object blurring processing,
the circuitry is further configured to transmit the captured image data, to which the object blurring processing is not applied, to the data processing server, and
the data processing server applies the object blurring processing to the captured image data.

10. The communication system of claim 9, wherein:
the specific processing information for the object blurring service further causes the data processing server to perform storing of the image, and
the data processing server stores the captured image data, which has been applied with the object blurring processing, in the memory.

11. The communication system of claim 1, further comprising:
a service providing server configured to provide a service program to the image acquisition terminal, the image acquisition terminal including processing circuitry configured to execute the service program to perform the processing according to the settings.

12. An image processing method, performed by a data processing terminal that transfers data between an image acquisition terminal that captures image data, and a data processing server, the method comprising:
in response to a request for performing a specific service, transmitting a request for obtaining specific processing information for the specific service to a first device being one of the image acquisition terminal and the data processing server;
receiving a response including the specific processing information from the first device, the specific processing information indicating processing to be executed by at least one of the image acquisition terminal and the data processing server in providing the specific service; and
transmitting the specific processing information to a second device of the image acquisition terminal and the data processing server other than the first device, to cause the second device to configure settings based on the specific processing information and execute processing on the captured image data according to the settings.

13. A non-transitory recording medium which, when executed by one or more processors, cause the processors to perform an image processing method, performed by a data processing terminal that transfers data between an image acquisition terminal that captures image data, and a data processing server, the method comprising:
in response to a request for performing a specific service, transmitting a request for obtaining specific processing information for the specific service to a first device being one of the image acquisition terminal and the data processing server;
receiving a response including the specific processing information from the first device, the processing information indicating processing to be executed by at least one of the image acquisition terminal and the data processing server in providing the specific service; and
transmitting the specific processing information to a second device of the image acquisition terminal and the data processing server other than the first device, to cause the second device to configure settings based on the specific processing information and execute processing on the captured image data according to the settings.

* * * * *